United States Patent
Kunieda et al.

(10) Patent No.: US 9,654,750 B2
(45) Date of Patent: May 16, 2017

(54) IMAGE PROCESSING SYSTEM, IMAGE PROCESSING APPARATUS, AND IMAGE PROCESSING METHOD TO RESPECTIVELY DISPLAY IMAGES OBTAINED BY DIVIDING ONE IMAGE ON FIRST AND THE SECOND DISPLAY MEDIA

(71) Applicants: Takayuki Kunieda, Tokyo (JP); Fumihiro Hasegawa, Tokyo (JP); Miyuki Oda, Tokyo (JP); Yukinaka Uchiyama, Tokyo (JP)

(72) Inventors: Takayuki Kunieda, Tokyo (JP); Fumihiro Hasegawa, Tokyo (JP); Miyuki Oda, Tokyo (JP); Yukinaka Uchiyama, Tokyo (JP)

(73) Assignee: RICOH COMPANY, LIMITED, Tokyo (JP)

(*) Notice: Subject to any disclaimer, the term of this patent is extended or adjusted under 35 U.S.C. 154(b) by 238 days.

(21) Appl. No.: 14/478,336

(22) Filed: Sep. 5, 2014

(65) Prior Publication Data
US 2015/0077584 A1 Mar. 19, 2015

(30) Foreign Application Priority Data
Sep. 17, 2013 (JP) ................. 2013-192478

(51) Int. Cl.
*H04N 9/31* (2006.01)
*G03B 21/14* (2006.01)
*G06T 5/00* (2006.01)

(52) U.S. Cl.
CPC ......... *H04N 9/3185* (2013.01); *G03B 21/147* (2013.01); *G06T 5/006* (2013.01); *H04N 9/3191* (2013.01); *H04N 9/3194* (2013.01)

(58) Field of Classification Search
CPC ........ G03B 21/14; G03B 21/147; H04N 3/23; H04N 3/233; H04N 3/2335; H04N 3/22;
(Continued)

(56) References Cited

U.S. PATENT DOCUMENTS 6,483,537 B1* 11/2002 Mayer, III ............... H04N 5/74
  348/180
7,055,958 B2* 6/2006 Tajima ..................... G06T 3/00
  348/E5.137
(Continued)

FOREIGN PATENT DOCUMENTS

JP    2006-284990    10/2006
JP    2014-003586    1/2014

OTHER PUBLICATIONS

U.S. Appl. No. 13/896,912, filed May 17, 2013.

*Primary Examiner* — Ngoc-Yen Vu
(74) *Attorney, Agent, or Firm* — Harness, Dickey & Pierce, P.L.C.

(57) ABSTRACT

An image processing apparatus includes: a first acquiring unit that acquires a first pattern image including a prespecified pattern for being displayed on a display medium by a display unit; a second acquiring unit that acquires, as a second pattern image, a captured image obtained by capturing an image obtained by displaying the first pattern image on the display medium from a desired position except the front of the display medium; and an image processing unit that compares the first pattern image with the second pattern image, and deforms a target image according to a result of the comparison.

9 Claims, 19 Drawing Sheets

(58) Field of Classification Search
CPC .. H04N 9/3185; H04N 9/3191; H04N 9/3194; G06T 5/006
USPC ................ 348/745, 746; 353/70; 359/69–70
See application file for complete search history.

(56) References Cited

U.S. PATENT DOCUMENTS

| | | | |
|---|---|---|---|
| 8,730,370 B2* | 5/2014 | Hidaka | H04N 5/3572 348/340 |
| 8,950,872 B2* | 2/2015 | Hasegawa | H04N 9/3194 348/189 |
| 9,195,121 B2* | 11/2015 | Sajadi | G03B 21/14 |
| 9,344,695 B2* | 5/2016 | Shibata | H04N 9/3185 |
| 2007/0291184 A1* | 12/2007 | Harville | G06T 3/005 348/745 |
| 2014/0267427 A1 | 9/2014 | Hasegawa | |

* cited by examiner

Sx IN X-DIRECTION

Sy IN Y-DIRECTION

| LUMINANCE GRADIENT DIRECTION | DIRECTION CODE |
|---|---|
| $\theta(x, y) \geq 67.5°$ OR $\theta(x, y) \leq -67.5°$ | $D(x, y) = 1$ |
| $22.5° < \theta(x, y) < 67.5°$ | $D(x, y) = 2$ |
| $-22.5° \leq \theta(x, y) \leq 22.5°$ | $D(x, y) = 3$ |
| $-67.5° < \theta(x, y) < -22.5°$ | $D(x, y) = 4$ |

↓ VERTICAL

↘ DOWNWARD TO RIGHT

→ HORIZONTAL

↗ UPWARD TO RIGHT

FIG.21

| DIRECTION CODE | NON-MAXIMUM SUPPRESSION THRESHOLD |
|---|---|
| D (x, y)=1 | T2 (x, y)=Max{E (x, y+1), E (x, y-1)} |
| D (x, y)=2 | T2 (x, y)=Max{E (x+1, y+1), E (x-1, y-1)} |
| D (x, y)=3 | T2 (x, y)=Max{E (x+1, y), E (x-1, y)} |
| D (x, y)=4 | T2 (x, y)=Max{E (x-1, y+1), E (x+1, y-1)} |

\* Max{A, B} GIVES LARGER VALUE OF A AND B.

FIG.22

| 0 | 0 | 0 | 0 | 0 | 0 | 0 | 0 |
|---|---|---|---|---|---|---|---|
| 0 | 0 | 0 | 1 | 1 | 0 | 0 | 0 |
| 0 | 0 | 4 | 0 | 0 | 2 | 0 | 0 |
| 0 | 3 | 0 | 0 | 0 | 0 | 3 | 0 |
| 0 | 3 | 0 | 0 | 0 | 0 | 3 | 0 |
| 0 | 0 | 2 | 0 | 0 | 4 | 0 | 0 |
| 0 | 0 | 0 | 1 | 1 | 0 | 0 | 0 |
| 0 | 0 | 0 | 0 | 0 | 0 | 0 | 0 |

FIG.23

| DIRECTION CODE | FIGURE-GROUND SEGREGATION THRESHOLD | |
|---|---|---|
| D (x, y)=1 | Q (x, y)={P (x, y-1)+P (x, y+1)}/2 | MEDIAN LUMINANCE OF UPPER AND LOWER ADJACENT PIXELS |
| D (x, y)=2 | Q (x, y)={P (x-1, y-1)+P (x+1, y+1)}/2 | MEDIAN LUMINANCE OF UPPER-LEFT AND LOWER-RIGHT ADJACENT PIXELS |
| D (x, y)=3 | Q (x, y)={P (x-1, y)+P (x+1, y)}/2 | MEDIAN LUMINANCE OF RIGHT AND LEFT ADJACENT PIXELS |
| D (x, y)=4 | Q (x, y)={P (x+1, y-1)+P (x-1, y+1)}/2 | MEDIAN LUMINANCE OF UPPER-RIGHT AND LOWER-LEFT ADJACENT PIXELS |

FIG.25

| 0 | 0 | 0 | 1 | 0 | 0 | 0 | 0 |
|---|---|---|---|---|---|---|---|
| 0 | 0 | 1 | 6 | 7 | 0 | 0 | 0 |
| 0 | 0 | 7 | 8 | 7 | 7 | 0 | 0 |
| 0 | 7 | 8 | 11 | 11 | 9 | 8 | 2 |
| 0 | 7 | 9 | 10 | 12 | 9 | 7 | 1 |
| 0 | 0 | 7 | 9 | 10 | 8 | 1 | 0 |
| 0 | 0 | 0 | 8 | 8 | 1 | 0 | 0 |
| 0 | 0 | 0 | 0 | 0 | 0 | 0 | 0 |

FIGURE-GROUND
EVALUATION VALUES
C (x, y)

FIG.26

| 0 | 0 | 0 | 0 | 0 | 0 | 0 | 0 |
|---|---|---|---|---|---|---|---|
| 0 | 0 | 0 | 1 | 1 | 0 | 0 | 0 |
| 0 | 0 | 1 | 1 | 1 | 1 | 0 | 0 |
| 0 | 1 | 1 | 1 | 1 | 1 | 1 | 0 |
| 0 | 1 | 1 | 1 | 1 | 1 | 1 | 0 |
| 0 | 0 | 1 | 1 | 1 | 1 | 0 | 0 |
| 0 | 0 | 0 | 1 | 1 | 0 | 0 | 0 |
| 0 | 0 | 0 | 0 | 0 | 0 | 0 | 0 |

BINARY IMAGES B (x, y)
* B (x, y)=1 IF C (x, y)≥4

IMAGE PROCESSING SYSTEM, IMAGE PROCESSING APPARATUS, AND IMAGE PROCESSING METHOD TO RESPECTIVELY DISPLAY IMAGES OBTAINED BY DIVIDING ONE IMAGE ON FIRST AND THE SECOND DISPLAY MEDIA

CROSS-REFERENCE TO RELATED APPLICATIONS

The present application claims priority to and incorporates by reference the entire contents of Japanese Patent Application No. 2013-192478 filed in Japan on Sep. 17, 2013.

BACKGROUND OF THE INVENTION

1. Field of the Invention

The present invention relates to an image processing system, an image processing apparatus, and an image processing method.

2. Description of the Related Art

In these years, improvements in performances of projectors and the like have allowed higher-definition images to be projected on larger screens. Japanese Patent Application Laid-open No. 2006-284990 discloses a technology that uses a plurality of projectors to combine a plurality of images that have been divided and wirelessly transmitted on a large screen. In these years, advertising media (digital signage) called electronic signboards are also widely used that display video pictures and information using digital data.

In general, conventional projectors project images on the assumption that the projection images are viewed from the front of a screen. In the same manner, the digital signage displays images so that the images correctly appear when viewed from the front of a display.

There is, for example, a problem that a user located on an end side of a screen on which a projector projects an image views the screen from an oblique direction, and sees the projection image projected on the screen as a distorted shape. Specifically, the user located on the end side of the screen views an image that gradually decreases in size from the near side toward the far side of the screen when viewed from the user. The same applies to another user located on the side opposite to the aforementioned user with respect to the screen. This phenomenon in which the projection image appears distorted according to the user position occurs more significantly as the projection image is larger.

The same problem occurs in the digital signage. Suppose, for example, a case in which displays are provided so as to face a direction of a pathway at respective columns lined up at constant intervals on a side of the pathway. In this case, a user walking in the pathway always views the displays from an oblique direction, so that images on the displays appear distorted. To view an image displayed on each of the displays in a correct shape, the user needs to move each time to the front of the display.

Therefore, it is desirable to allow a distortion of an image to be reduced when a screen or a display is viewed from an oblique direction.

SUMMARY OF THE INVENTION

It is an object of the present invention to at least partially solve the problems in the conventional technology.

According to an aspect of the present invention, there is provided an image processing system including: a display apparatus; an image capturing apparatus; and an image processing apparatus, the display apparatus including a display unit that displays an image on a display medium, the image capturing apparatus including an image capturing unit that outputs a captured image obtained by imaging a subject, and the image processing apparatus including: a first acquiring unit that acquires a first pattern image including a prespecified pattern for being displayed on the display medium by the display unit; a second acquiring unit that acquires, as a second pattern image, a captured image obtained by capturing an image obtained by displaying the first pattern image on the display medium with the display unit, the capturing being performed by the image capturing apparatus from a desired position except the front of the display medium; and an image processing unit that compares the first pattern image with the second pattern image, and deforms a target image according to a result of the comparison.

According to another aspect of the present invention, there is provided an image processing apparatus including: a first acquiring unit that acquires a first pattern image including a prespecified pattern for being displayed on a display medium by a display unit; a second acquiring unit that acquires, as a second pattern image, a captured image obtained by capturing an image obtained by displaying the first pattern image on the display medium from a desired position except the front of the display medium; and an image processing unit that compares the first pattern image with the second pattern image, and deforms a target image according to a result of the comparison.

According to still another aspect of the present invention, there is provided an image processing method including: acquiring a first pattern image including a prespecified pattern for being displayed on a display medium by a display unit; acquiring, as a second pattern image, a captured image obtained by capturing an image obtained by displaying the first pattern image on the display medium from a desired position except the front of the display medium; and comparing the first pattern image with the second pattern image, and deforming a target image according to a result of the comparison.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21 is a diagram illustrating an example of correspondence relations between the direction codes and non-maximum suppression thresholds applicable to each of the embodiments;

FIG. 22 is a diagram illustrating an example of the direction codes assigned to pixels around a circle applicable to each of the embodiments, the pixels having been subjected to edge thinning processing and serving as one pattern element;

FIG. 23 is a diagram illustrating examples of expressions that calculate figure-ground segregation thresholds for the corresponding direction codes applicable to each of the embodiments;

FIG. 25 is a diagram illustrating a state in which the figure-ground evaluation values have been assigned to the corresponding pixels constituting the pattern element applicable to each of the embodiments;

FIG. 26 is a diagram illustrating a state after the pixels are binarized applicable to each of the embodiments.

DETAILED DESCRIPTION OF THE PREFERRED EMBODIMENTS

Embodiments of an image processing system, an image processing apparatus, an image processing method, an image processing program, and a display system will be described below in detail with reference to the accompanying drawings.

First Embodiment

A first embodiment of the present invention will be described. For example, when a projection image projected on a screen is captured to be used later, the first embodiment obtains, based on the captured image obtained by capturing the projection image, correction information for correcting the projection image in the captured image into a correct shape, and uses the correction information to correct the captured image obtained by capturing the projection image.

Figure 1:
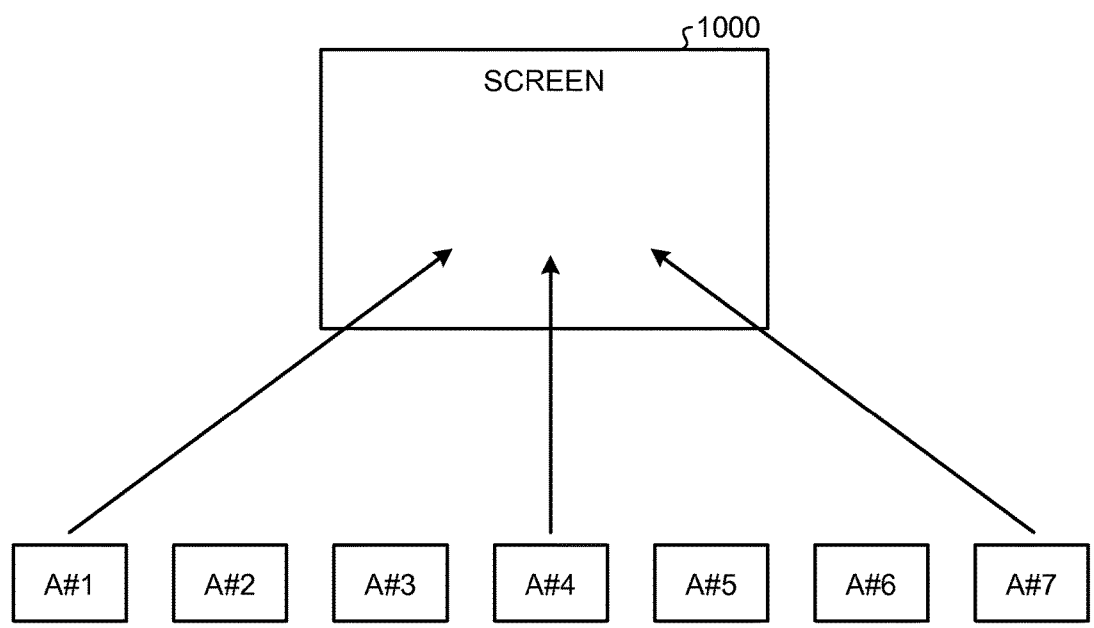
FIG. 1 is a diagram for briefly explaining an environment applicable to a first embodiment of the present invention.

An environment applicable to the first embodiment will be briefly explained using FIG. 1. Consider a case in which, as illustrated in FIG. 1, a rectangular projection image 1000 is projected from a projector (not illustrated) onto a screen placed in front of the projector.

Figure 2A:
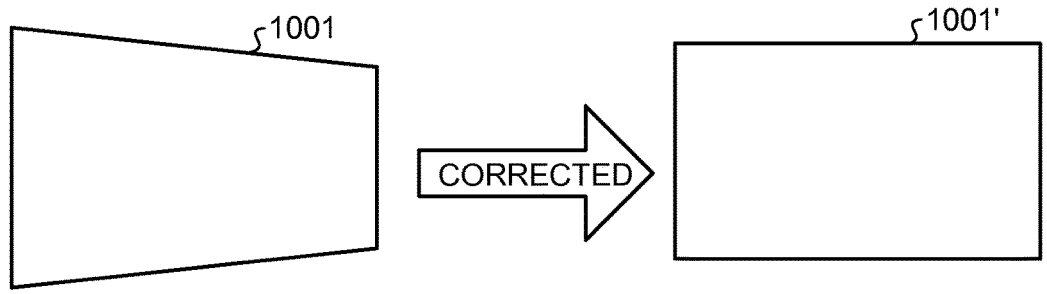
FIGS. 2A to 2C are diagrams illustrating examples of appearances of a projection image when a screen is viewed from the left end side, the central part, and the right end side, respectively, of the screen.
Figure 2B:
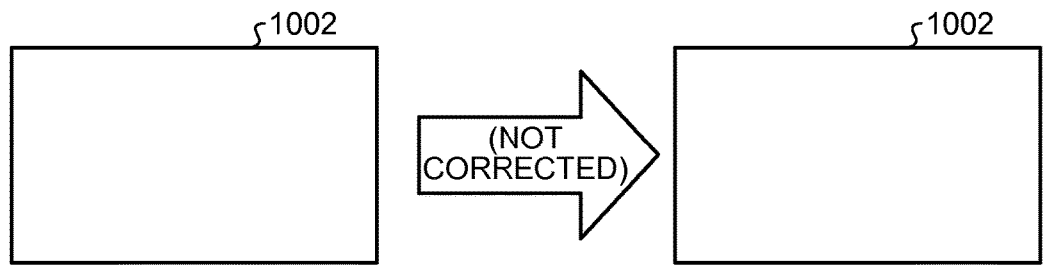
Figure 2C:
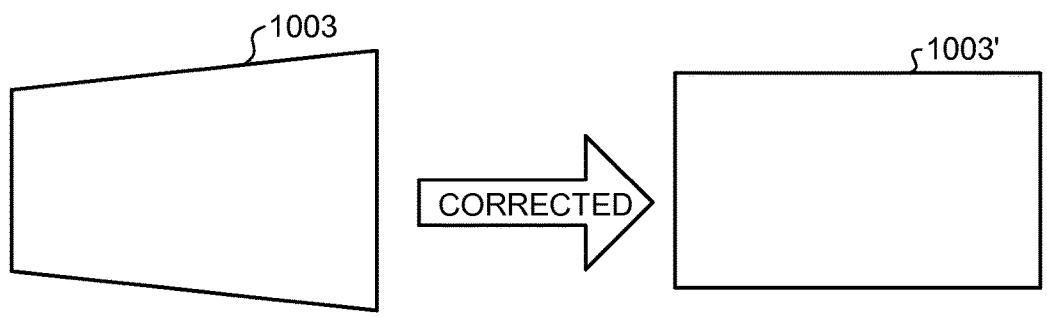

Seats A#1 to A#7 are placed from the left in front of the screen. FIGS. 2A to 2C illustrate examples of appearances of the projection image 1000 when the screen is viewed from the seat A#1 on the left end side, the seat A#4 at the central part, and the seat A#7 on the right end side, respectively, of the screen, among the seats A#1 to A#7.

When viewed from the position of the seat A#1 (on the left end side of the screen), the rectangular projection image 1000 appears to be a trapezoidal image 1001 with vertical and horizontal sizes reduced toward the right end of the screen, as illustrated on the left side in FIG. 2A. In this case, by capturing the image 1001 on the screen from the position of the seat A#1, and deforming the captured image, an image 1001' shaped approximate to the original rectangular image can be obtained (refer to the right side in FIG. 2A).

In the same manner, when viewed from the position of the seat A#7 (on the right end side of the screen), the rectangular projection image 1000 appears to be a trapezoidal image 1003 with vertical and horizontal sizes reduced toward the left end of the screen, as illustrated on the left side in FIG. 2C. In this case, by capturing the image 1003 on the screen from the position of the seat A#7, and deforming the captured image, an image 1003' shaped approximate to the original rectangular image can be obtained (refer to the right side in FIG. 2C).

When viewed from near the center of the screen, the projection image 1000 remains to have the rectangular shape as illustrated as an image 1002 on the left side in FIG. 2B. In this case, the captured image obtained by capturing the image 1002 on the screen from the position of the seat A#4 need not be deformed (refer to FIG. 2B).

The first embodiment deforms the image 1001 into the image 1001' and the image 1003 into the image 1003' as described above.

System Configuration According to First Embodiment

Figure 3:
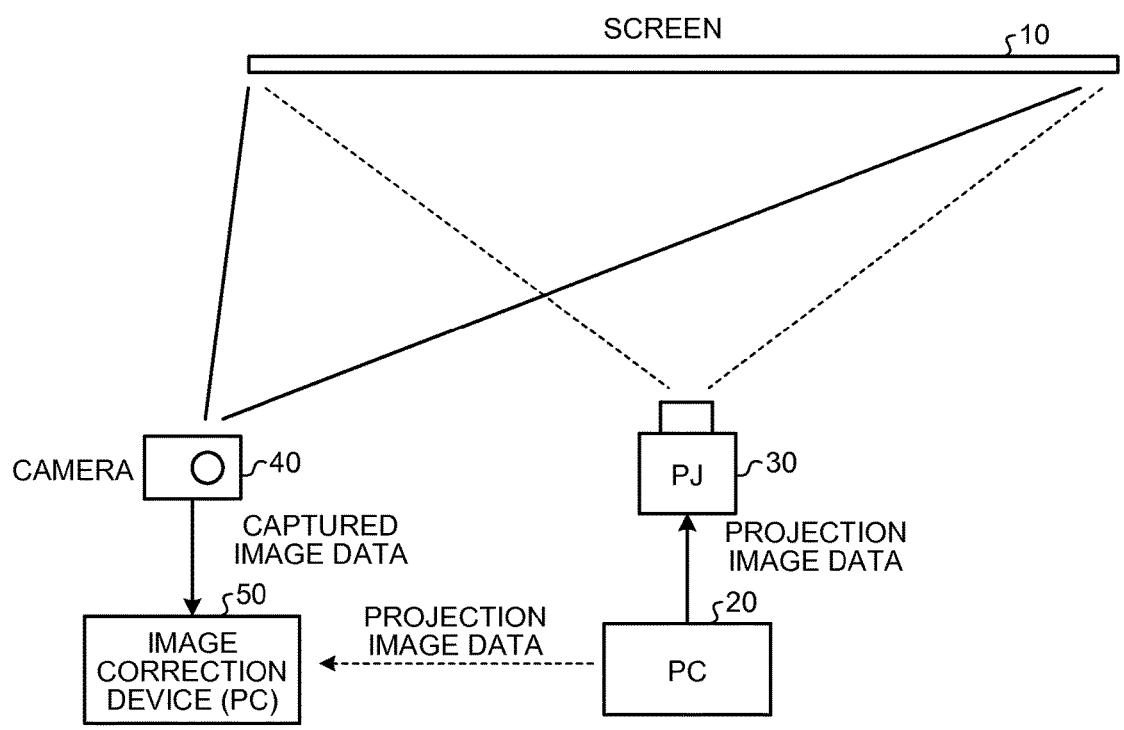
FIG. 3 is a block diagram illustrating the configuration of an example of an image processing system according to the first embodiment.

FIG. 3 illustrates the configuration of an example of the image processing system according to the first embodiment. A projector (PJ) 30 is supplied with projection image data output from, for example, a personal computer (PC) 20, and based on the supplied projection image data, projects an image to obtain a projection image on a screen 10.

In this case, the projection image projected on the screen 10 has substantially the same shape as that of the image output from the PC 20. For example, by placing the projector 30 in a substantially central position in front of the screen 10, and projecting the image, a projection image with little distortion from the original image can be obtained. The present invention is not limited to this. The shape of the image to be projected may be corrected in advance by keystone correction or the like according to the positional relation between the screen 10 and the projector 30.

A camera 40 captures from the position of a user the projection image projected from the projector 30 onto the screen 10. The camera 40 supplies captured image data obtained by capturing the projection image to an image correction device 50 constituted by, for example, a personal computer (PC). The image correction device 50 is also supplied with the projection image data from the PC 20. The image correction device 50 compares the captured image data supplied from the camera 40 with the projection image data that has been supplied from the PC 20 and corresponds to the captured image data, and obtains the correction information for deforming the shape of the projection image included in the captured image data into the shape of the image defined by the projection image data.

The user captures the projection image projected from the projector 30 onto the screen 10 under the same condition as the condition under which the correction information is obtained, and deforms the captured image with coefficients obtained by the image correction device 50. This allows the user, even when located in a position other than the central part in front of the screen 10, to deform the image on the screen 10 that appears trapezoidally distorted when viewed from the user position back into the original rectangular image and, for example, store the restored image.

Figure 4:
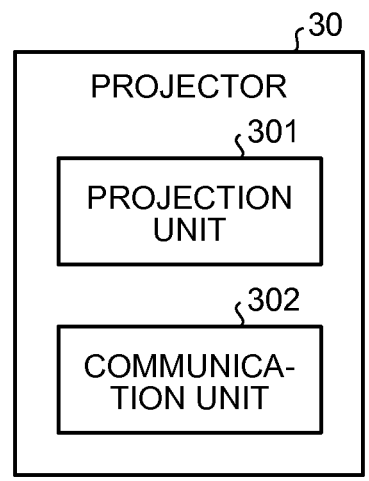
FIG. 4 is a functional block diagram of an example for explaining a function of a projector according to the first embodiment.

FIG. 4 is a functional block diagram of an example for explaining a function of the projector 30 according to the first embodiment. The projector 30 includes a projection unit 301 and a communication unit 302. The communication unit 302 communicates with external devices, such as the PC 20, and acquires the projection image data used for projection. The projection unit 301 includes an image processing unit, a light source, an optical modulation unit, and an optical system. The projection unit 301 modulates light from the light source according to the projection image data acquired by the communication unit 302, and externally projects the modulated light via the optical system.

Figure 5:
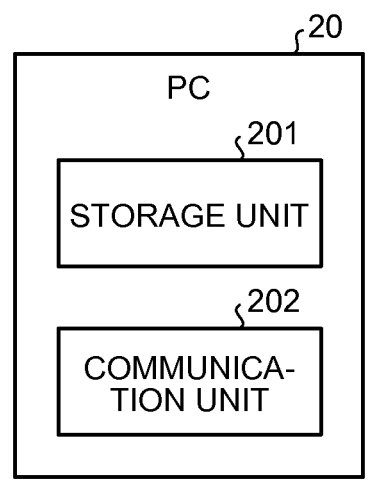
FIG. 5 is a functional block diagram of an example for explaining a function of a personal computer (PC) according to the first embodiment.

FIG. 5 is a functional block diagram of an example for explaining a function of the PC 20 according to the first embodiment. A commonly used computer can be used as the PC 20, which includes a storage unit 201 and a communication unit 202. The storage unit 201 stores the projection image data for being projected by the projector 30. The communication unit 202 communicates with the projector 30, and transfers the projection image data stored in the storage unit 201 to the projector 30. The communication unit 202 also communicates with the image correction device 50, and transfers the projection image data to the image correction device 50.

Figure 6:
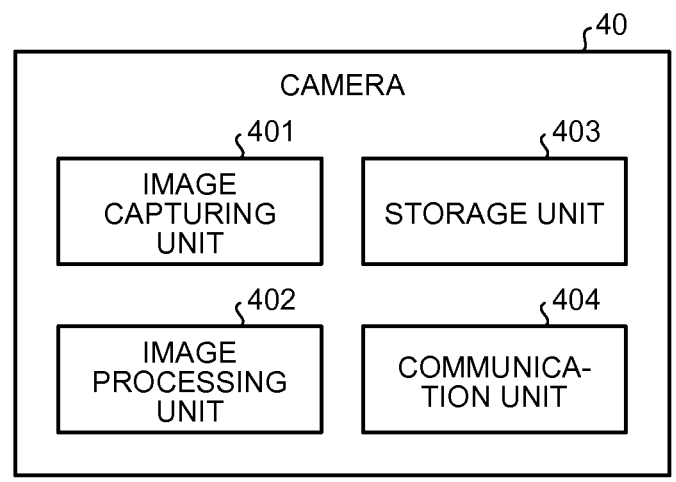
FIG. 6 is a functional block diagram of an example for explaining a function of a camera according to the first embodiment.

FIG. 6 is a functional block diagram of an example for explaining a function of the camera 40 according to the first embodiment. A commonly used digital camera can be used as the camera 40, which includes an image capturing unit 401, an image processing unit 402, a storage unit 403, and a communication unit 404. The image capturing unit 401 includes image pickup elements constituted by, for example, charge-coupled devices (CCDs) and an imaging optical system that guides light from a subject to the image pickup elements. The image capturing unit 401 captures the image of the subject, and outputs the captured image data. The image processing unit 402 applies predetermined image processing, such as gamma correction processing and white balance adjustment processing, to the captured image data output from the image capturing unit 401. The image processing unit 402 may apply data volume reduction processing, such as compression coding processing, to the captured image data. The storage unit 403 stores the captured image to which the image processing has been applied by the image processing unit 402. The communication unit 404 externally outputs the captured image data stored in the storage unit 403.

Figure 7:
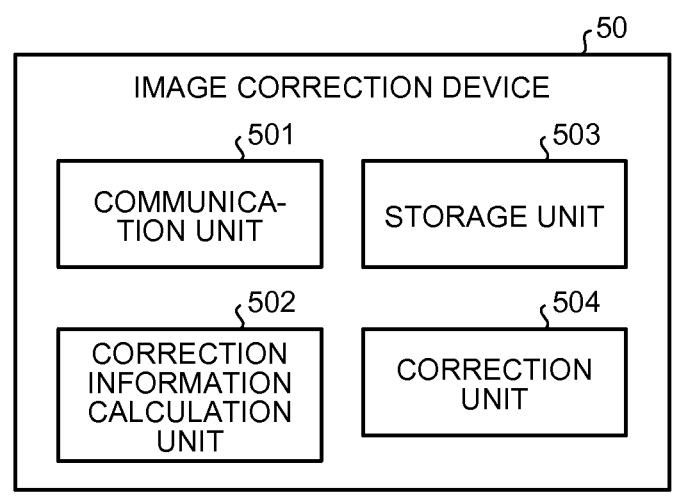
FIG. 7 is a functional block diagram of an example for explaining a function of an image correction device according to the first embodiment.

FIG. 7 is a functional block diagram of an example for explaining a function of the image correction device 50 according to the first embodiment. The image correction device 50 includes a communication unit 501, a correction information calculation unit 502, a storage unit 503, and a correction unit 504. A commonly used computer can be used as the image correction device 50. In this case, at least the correction information calculation unit 502 and the correction unit 504 are configured by a program that runs on a central processing unit (CPU).

The communication unit 501 communicates with the communication unit 404 of the camera 40, and acquires the captured image data. The communication unit 501 also communicates with the communication unit 202 of the PC 20, and acquires the projection image data. The storage unit 503 stores the captured image data and the projection image data acquired by the communication unit 501. The correction information calculation unit 502 uses the captured image data and the projection image data stored in the storage unit 503 to calculate the correction information for correcting the distortion of the projection image included in the image based on the captured image data. The correction unit 504 uses the correction information calculated by the correction information calculation unit 502 to correct or deform the captured image data stored in the storage unit 503.

The correction information calculation unit 502 and the correction unit 504 constitute an image processing unit that deforms or corrects a target image to be displayed on a display medium according to each of the embodiments.

While FIG. 3 is illustrated such that each of the camera 40, the image correction device 50, the PC 20, and the projector 30 is configured by an independent piece of hardware, the configuration is not limited to this example. For example, the camera 40 and the image correction device 50 may be provided as one package. The projector 30 and the PC 20 may be provided as one package, or the projector 30, the image correction device 50, and the PC 20 may be provided as one package.

Correction Processing According to First Embodiment

The correction processing according to the first embodiment will be described. In the first embodiment, an ideal pattern image that serves as a target after correction is projected as a projection image onto the screen 10. The camera 40 captures the image of the screen 10 on which the ideal pattern image is projected, and obtains a calibration pattern image to be corrected as a captured image. The image correction device 50 compares the ideal pattern image with the calibration pattern image, and calculates the correction information for correcting or deforming the shape of the calibration pattern image into the shape of the ideal pattern image.

Figure 8A:
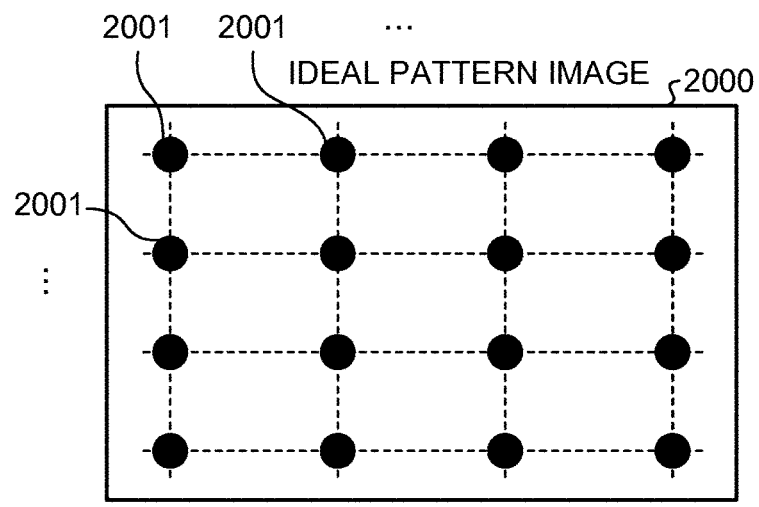
FIGS. 8A and 8B are diagrams for explaining an ideal pattern image and a calibration pattern image, respectively, according to the first embodiment.

The ideal and the calibration pattern images according to the first embodiment will be explained using FIGS. 8A and 8B. FIG. 8A illustrates an example of an ideal pattern image 2000. In the example of FIG. 8A, the ideal pattern image 2000 includes markers 2001, 2001, . . . that are arranged in a rectangular grid pattern. The configuration of the ideal pattern image 2000 is not limited to the example of FIG. 8A, and the markers 2001, 2001, . . . may be arranged in any pattern.

Figure 8B:
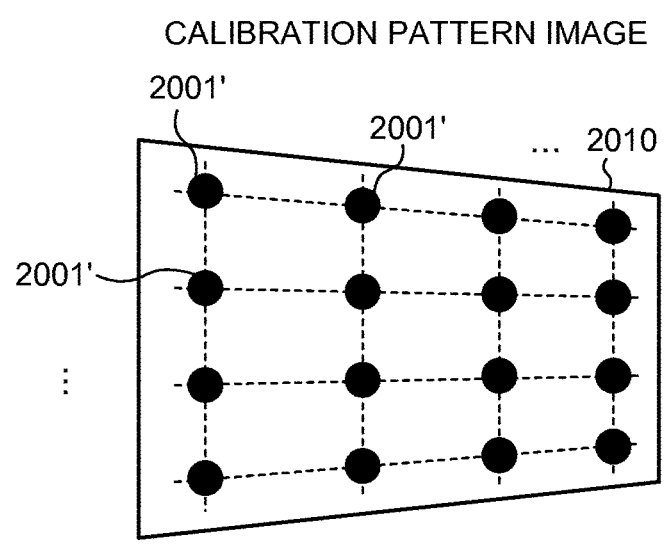

FIG. 8B illustrates an example of a calibration pattern image 2010. The calibration pattern image 2010 is an image that is included in the captured image obtained by capturing, using the camera 40 from the position of the user, the projection image obtained by projecting the ideal pattern image 2000 onto the screen 10 with the projector 30. In this example, the projection image on the screen 10 is captured from a position on the left end side of the screen 10, the position corresponding to the seat A#1 in FIG. 1 mentioned above.

In this case, as illustrated in FIG. 8B, the calibration pattern image 2010 is a trapezoidally distorted image with vertical and horizontal sizes reduced from the left end toward the right end of the image. As a result, the markers 2001, 2001, . . . in the ideal pattern image 2000 are arranged in the calibration pattern image 2010 with intervals therebetween sequentially reduced in the vertical and horizontal directions from the left end toward the right end of the image, as illustrated as markers 2001', 2001', in FIG. 8B.

In the image correction device 50, the correction information calculation unit 502 calculates the positions (coordinates) of the markers 2001', 2001', . . . in the calibration pattern image 2010 with a method to be described later, and compares them with the known positions (coordinates) of the markers 2001, 2001, . . . in the ideal pattern image 2000. Based on this comparison, the correction information calculation unit 502 obtains positional deviations of the markers 2001', 2001', relative to the markers 2001, 2001, . . . , respectively, as the correction information. Based on the obtained correction information, and using known methods such as linear transformation and linear interpolation, the correction unit 504 corrects other captured image data that has been obtained by capturing the image of the screen 10 in the same manner and is stored in the storage unit 503.

Figure 9:
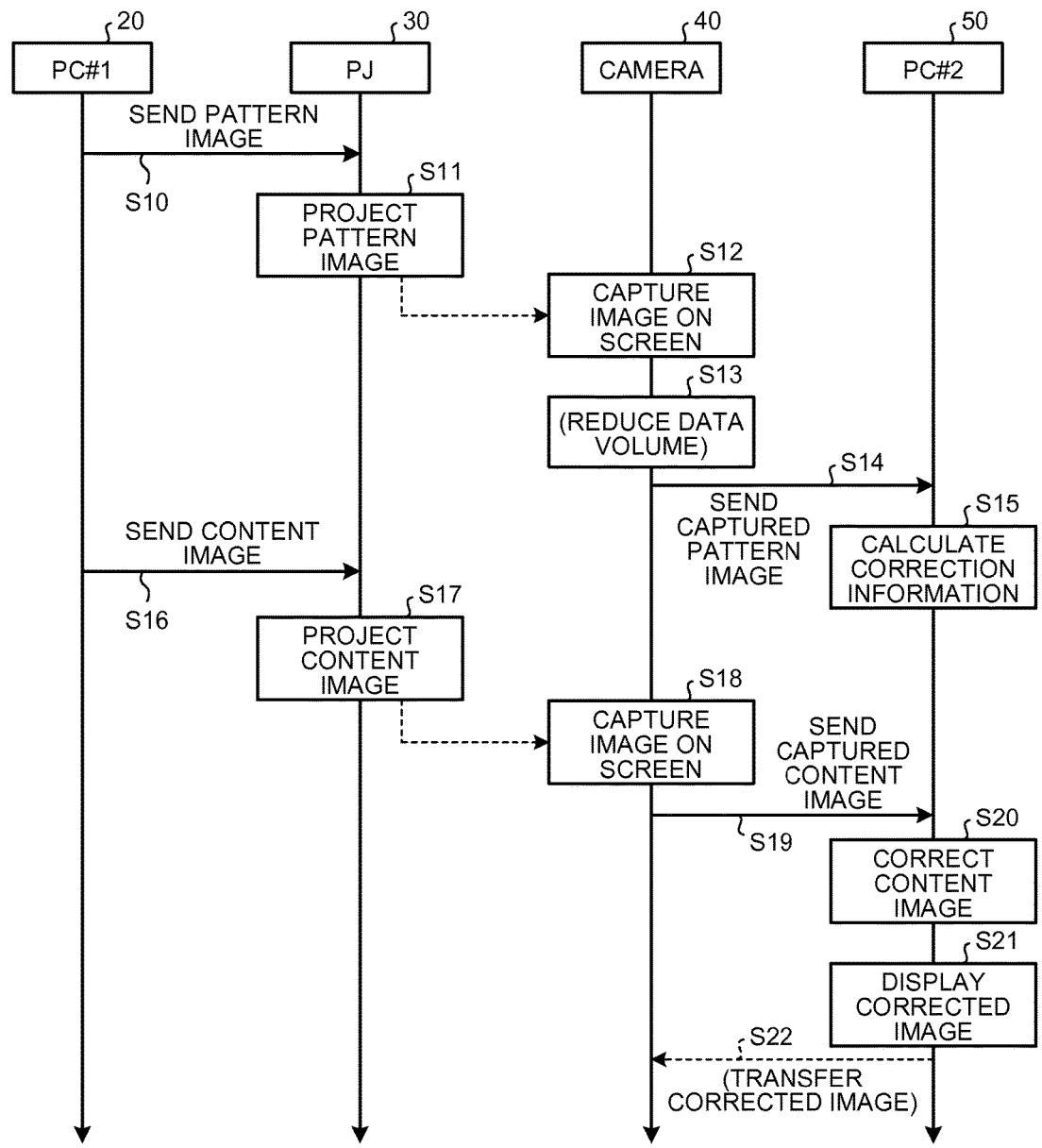
FIG. 9 is a sequence diagram illustrating a procedure of an example of image processing according to the first embodiment.

FIG. 9 is a sequence diagram illustrating a procedure of an example of image processing according to the first embodiment. FIG. 9 represents the PC 20 and the image correction device 50 as "PC#1" and "PC#2", respectively. Before the sequence in FIG. 9 is executed, projection image data for projecting the ideal pattern image 2000 (called "projected ideal pattern image data") has been stored in the storage unit 201 of the PC 20 and the storage unit 503 of the image correction device 50. The coordinate information of the markers 2001, 2001, . . . in the projected ideal pattern image data has also been stored in the storage unit 503 of the image correction device 50.

The PC 20 first sends the projected ideal pattern image data to the projector 30 (Step S10). The projector 30 projects a projection image based on the projected ideal pattern image data sent from the PC 20 onto the screen 10 (Step S11). As a result, the ideal pattern image 2000 is projected as a projection image onto the screen 10.

The camera 40 captures the ideal pattern image 2000 projected on the screen 10 (Step S12). The image thus captured is the calibration pattern image 2010 that is a trapezoidally distorted image of the ideal pattern image 2000. The camera 40 applies the data volume reduction processing, as needed, to the captured image data (called "captured calibration pattern image data") based on the calibration pattern image 2010 (Step S13), and send the result to the image correction device 50 (Step S14). The image correction device 50 analyzes the captured calibration pattern image data with a method to be described later, and obtains the coordinates of the markers 2001', 2001', . . . included in the calibration pattern image 2010. The image correction device 50 then compares the coordinates of the markers 2001', 2001', . . . with the respective coordinates of the markers 2001, 2001, . . . in the ideal pattern image 2000 stored in the storage unit 503, and calculates the correction information (Step S15). The calculated correction information is stored, for example, in the storage unit 503.

Image data of a content image (called "content image data") that is actually used for presentations or the like is sent from the PC 20 to the projector 30 (Step S16). The projector 30 projects a projection image based on the content image data sent from the PC 20 onto the screen 10 (Step S17).

The camera 40 captures the projection image based on the content image (called "projected content image") projected on the screen 10 (Step S18). The projected content image thus captured is a trapezoidally distorted image of the content image. The camera 40 sends the captured image data based on the projected content image (called "captured content image data") to the image correction device 50 (Step S19).

In the image correction device 50, based on the correction information obtained at Step S15, and using known methods such as the linear transformation and the linear interpolation, the correction unit 504 corrects the captured content image data sent from the camera 40 at Step S19 (Step S20). The image data obtained by correcting the captured content image data is displayed, for example, on a display connected to the image correction device 50 at next Step S21. The image data after the correction may be transferred to the camera 40 (Step S22).

As has been described above, according to the first embodiment, the projection image obtained by projecting the ideal pattern image 2000 onto the screen 10 is captured from the position of the user, and the ideal pattern image 2000 and the calibration pattern image 2010 obtained by capturing the ideal pattern image 2000 are used to obtain the correction information for correcting the shape of the calibration pattern image 2010 into the shape of the ideal pattern image 2000. The correction information is used to correct the captured image obtained by capturing the content image projected on the screen 10. This can correct the captured image obtained by capturing the image of the screen 10 from the position facing the screen 10 from an oblique direction to an image having the same shape as that of the original projected image.

Second Embodiment

A second embodiment of the present invention will be described. The second embodiment generates an image that is distorted in advance so as to appear in a normal shape when a display medium, such as a screen or a display, is viewed from a predetermined position other the position in front of the display medium, and displays the image on the display medium.

Figure 10:
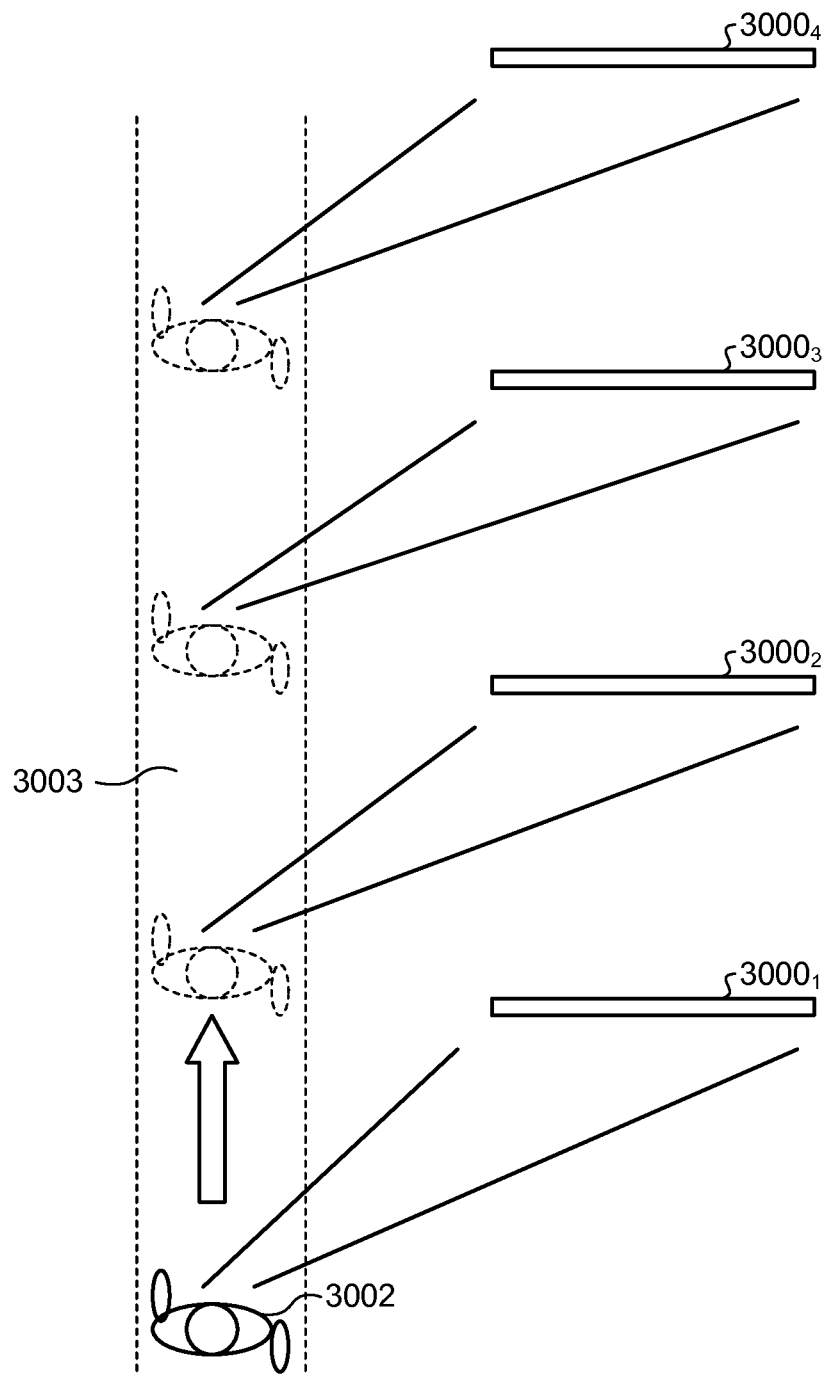
FIG. 10 is a diagram for explaining the outline of a second embodiment of the present invention.
Figure 11:
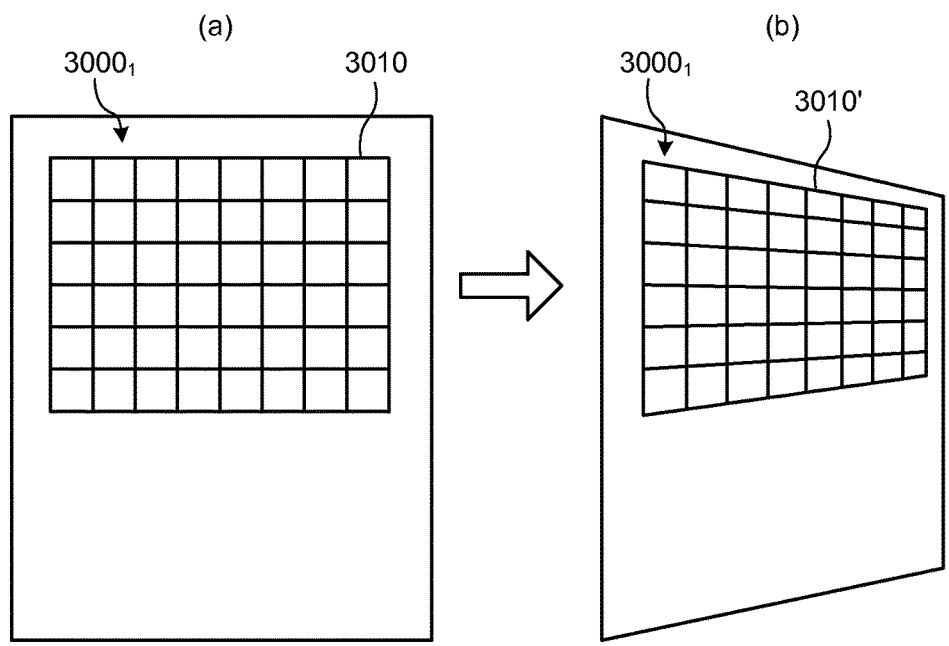
FIG. 11 is other diagram for explaining the outline of the second embodiment.

The outline of the second embodiment will be described using FIGS. 10 to 12. As illustrated in FIG. 10, columns provided with respective displays $3000_1$, $3000_2$, $3000_3$, and $3000_4$ are installed at constant intervals parallel to and on the right side of a pathway 3003 in which, for example, a user 3002 is assumed to walk. Each of the displays $3000_1$, $3000_2$, $3000_3$, and $3000_4$ is a display medium, for which, for example, a liquid-crystal display (LCD) is used. The display surface of each of the displays $3000_1$, $3000_2$, $3000_3$, and $3000_4$ is provided facing the direction in which the user 3002 is assumed to advance in the pathway 3003. Specifically, the display surfaces of the respective displays $3000_1$, $3000_2$, $3000_3$, and $3000_4$ are arranged so as to face a direction assumed to be an advancing direction of the user 3002, and so as not to intersect an assumed movement line of the user 3002.

While the display surfaces of the respective displays $3000_1$, $3000_2$, $3000_3$, and $3000_4$ are arranged so as to be parallel to one another in the example of FIG. 10, the arrangement is not limited to this example. The display surfaces of the respective displays $3000_1$, $3000_2$, $3000_3$, and $3000_4$ may be oriented in different directions from one another.

For example, as illustrated in FIG. 11(a), a rectangular image 3010 is displayed on the display $3000_1$. In this state, consider a case in which the user 3002 sees the display $3000_1$ in the right direction from the position illustrated in FIG. 10. In this case, as illustrated in FIG. 11(b), the display $3000_1$ appears to be a trapezoidal shape with vertical and horizontal sizes reduced from the near side (left end) toward the right end, and the image 3010 also appears to be a trapezoidally distorted image 3010' to the user 3002 in the same manner.

Hence, as illustrated in FIG. 12(a), the second embodiment displays, on the display $3000_1$, an image 3011 obtained by distorting in advance the original rectangular image in the opposite direction, that is, the image 3011 that is distorted in advance into a trapezoidal shape with vertical and horizontal sizes increased from the left end toward the right end thereof. Doing this allows the user 3002 to see an image 3011' obtained by deforming the image 3011 into a rectangle as illustrated in FIG. 12(b) when the user 3002 views the display $3000_1$ in an oblique direction from a predetermined position.

System Configuration According to Second Embodiment

Figure 13:
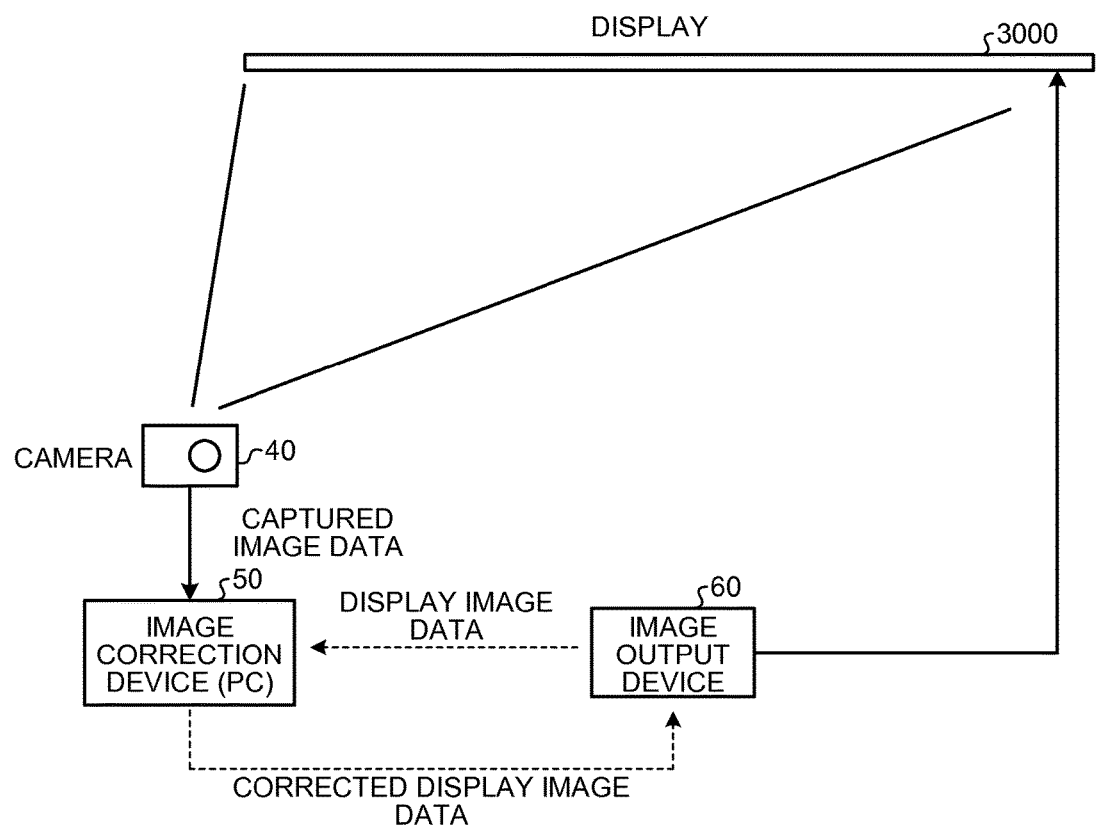
FIG. 13 is a block diagram illustrating the configuration of an example of an image processing system according to the second embodiment.

FIG. 13 illustrates the configuration of an example of an image processing system according to the second embodiment. In FIG. 13, the same numerals are given to portions in common with those in FIG. 3 mentioned above, and detailed description thereof will be omitted.

In FIG. 13, a display 3000 is a display medium for which, for example, a liquid-crystal display (LCD) is used, and displays an image according to externally supplied display image data. An image output device 60 includes a storage unit and a communication unit, and supplies image data stored in the storage unit and image data externally supplied via the communication unit as the display image data to the display 3000. The image output device 60 can also send the display image data to the image correction device 50 via the communication unit.

Figure 12:
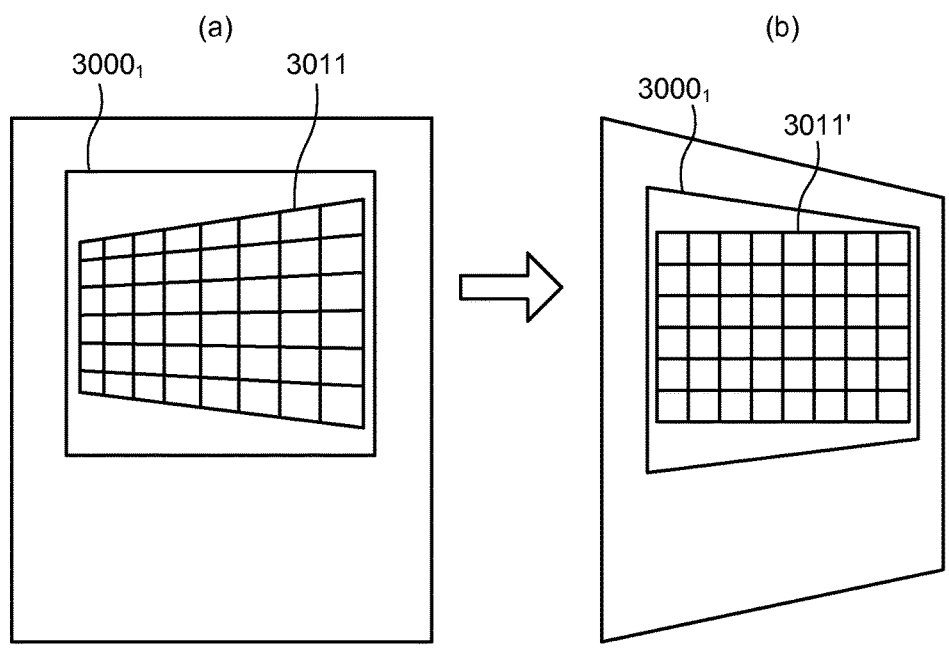
FIG. 12 is still other diagrams for explaining the outline of the second embodiment.

The second embodiment generates the image illustrated in FIG. 12 (a) that is trapezoidally distorted in advance as the ideal pattern image. The second embodiment deforms the rectangular image that is prepared as the calibration pattern image and is originally to be displayed on the display 3000 into the shape of the ideal pattern image, and then displays the deformed image on the display 3000.

Figure 14A:
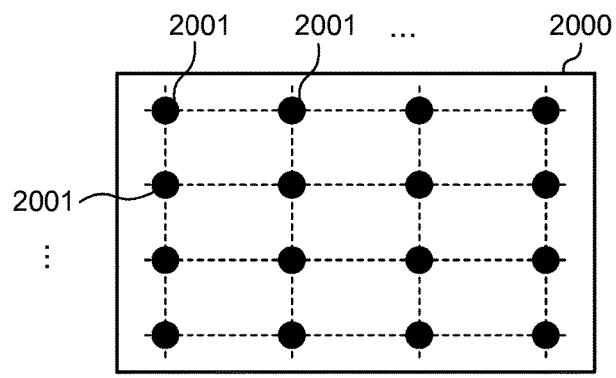
FIGS. 14A to 14D are diagrams illustrating examples of ideal pattern images and calibration pattern images according to the second embodiment.

A method for generating the ideal pattern image according to the second embodiment will be described using FIGS. 14A to 14D. First, as illustrated in FIG. 14A, the image output device 60 displays, on the display 3000, a pattern image 2000 that is the same as the ideal pattern image 2000 described using FIG. 8A and includes the markers 2001, 2001, . . . arranged in the rectangular grid pattern. In this case, the whole surface of the effective display area of the display 3000 is used to display the pattern image 2000.

The image of the display 3000 is captured using the camera 40 from a desired position. For example, as illustrated in FIG. 14B, if the image of the display 3000 is captured in a direction in which the camera 40 faces the display 3000 from the left end side toward the right end of the display 3000, the image captured by the camera 40 is a trapezoidally distorted pattern image 2010 with vertical and horizontal sizes reduced from the left end toward the right end of the image in the same manner as the calibration pattern image 2010 described using FIG. 8B mentioned above.

Figure 14B:
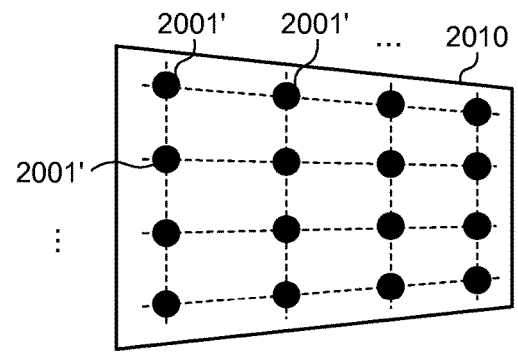
Figure 14C:
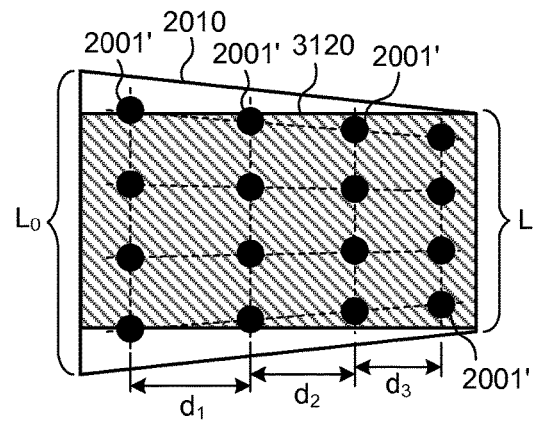
Figure 14D:
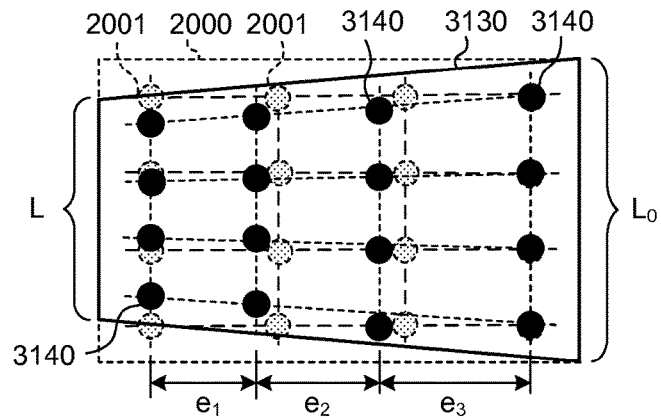

The whole surface of the display 3000 is used to display the pattern image 2010 in FIG. 14B. As a result, as illustrated in FIG. 14C, the maximum size of an apparent rectangular image that appears rectangular when viewed from the position of the camera 40 that has captured the pattern image 2010 is defined by an apparent size L of a side (right end in this example) of the display 3000 facing the position of the camera 40 when viewed from the position of the camera 40. The term "apparent size" refers to a size in a captured image captured by the camera 40.

In FIG. 14C, a rectangular area 3120 indicated by adding diagonal lines corresponds to the image 3011' in FIG. 12(b), and is an image area that appears rectangular when the display 3000 is viewed from the position of the camera 40 toward the image-capturing direction of the camera 40. In reality, that is, when the display 3000 is viewed from near the central part in front thereof, the rectangular area 3120 has a trapezoidally distorted shape with vertical and horizontal sizes increased from the left end toward the right end thereof, as illustrated as an area 3130 in FIG. 14D. The second embodiment deforms in advance the rectangular image into the trapezoidally distorted shape of the area 3130, and displays the deformed image on the display 3000 from the image output device 60.

More specific description will be given. The image output device 60 first displays the rectangular pattern image 2000 of FIG. 14A on the display 3000. The camera 40 captures the pattern image 2000 from the desired position, and obtains the trapezoidally distorted pattern image 2010 of FIG. 14B. The camera 40 supplies the captured image data of the pattern image 2010 to the image correction device 50.

The image output device 60 supplies the display image data for displaying the pattern image 2000 and the coordinates of the markers 2001, 2001, . . . in the pattern image 2000 to the image correction device 50. The image output device 60 may supply only the coordinates of the markers 2001, 2001, . . . , without supplying the pattern image 2000, to the image correction device 50.

In the image correction device 50, the correction information calculation unit 502 calculates the coordinates of the markers 2001', 2001', . . . from the captured image data according to a method to be described later. The correction information calculation unit 502 then compares the calculated coordinates with the coordinates of the respective markers 2001 of the pattern image 2000, and based on the results of the comparison, obtains the apparent size L of the right end and an apparent size $L_0$ of the left end of the pattern image 2010. The correction information calculation unit 502 then generates the trapezoidal area 3130 with vertical sizes of the left and the right ends set to the sizes L and $L_0$, respectively, and a horizontal size set equal to the size of the pattern 2000.

The sizes L and $L_0$ can be obtained based on coordinate information in units of pixels in the captured image data.

Moreover, the correction information calculation unit 502 arranges markers 3140, 3140, . . . for the area 3130. As an example, in the example of FIG. 14D, the horizontal positions of markers 3140, 3140, . . . vertically lined up at the left end and the right end are matched with the respective horizontal positions of corresponding markers 2001, 2001, . . . of the pattern image 2000. The vertical positions of the markers 3140, 3140, . . . are set to positions obtained by changing the vertical positions of the corresponding markers 2001, 2001, . . . of the pattern image 2000 according to the ratio ($L/L_0$) between the sizes L and $L_0$.

The horizontal positions of other markers 3140, 3140, . . . are determined, for example, according to ratios among horizontal distances $d_1$, $d_2$, and $d_3$ between markers 2001', 2001', . . . in the pattern image 2010. As an example, as illustrated in FIG. 14C, the horizontal distances between the markers 2001', 2001', . . . in the pattern image 2010 are represented as $d_1$, $d_2$, and $d_3$ from the left end. The distances between the markers 3140, 3140, . . . in the area 3130 are represented as distances $e_1$, $e_2$, and $e_3$ from the left end.

In this case, the horizontal positions of the markers 3140, 3140, . . . are considered to be determined so that the relation between the distances $e_1$, $e_2$, and $e_3$ and the distances $d_1$, $d_2$, and $d_3$ results in the relation given by the following expression (1).

$$e_1:e_2:e_3=d_3:d_2:d_1 \quad (1)$$

The correction information calculation unit 502 compares the coordinates of the respective markers 2001, 2110, . . . of the pattern image 2000 with the coordinates of the respective markers 3140, 3140, . . . of the area 3130 that are obtained as described above, and calculates the correction information. In this case, the correction information calculation unit 502 calculates the correction information for correcting the rectangular image given by the pattern image 2000 into the trapezoidal image given by the area 3130. Specifically, in the second embodiment, the rectangular pattern image 2000 corresponds to the calibration pattern image to be corrected, and the image of the trapezoidal area 3130 corresponds to the ideal pattern image.

The image correction device 50 stores in advance, for example, in the storage unit 503, rectangular display image data for being displayed on the display 3000 by the image output device 60. The present invention is not limited to this. The display image data may be externally supplied to the image correction device 50 via the communication unit 501. In the image correction device 50, the correction unit 504 corrects the display image data stored in the storage unit 503 based on the correction information.

The corrected display image data obtained by correcting the display image data is supplied from the image correction device 50 to the image output device 60. The image output device 60 displays the corrected display image data supplied from the image correction device 50 on the display 3000. As a result, an image that is trapezoidally distorted in advance as explained using FIG. 12(a) is displayed on the display 3000, and by viewing this image from the predetermined position, the user can see as if a rectangular image were displayed, as illustrated in FIG. 12(b).

Application Example of Second Embodiment

Figure 15A:
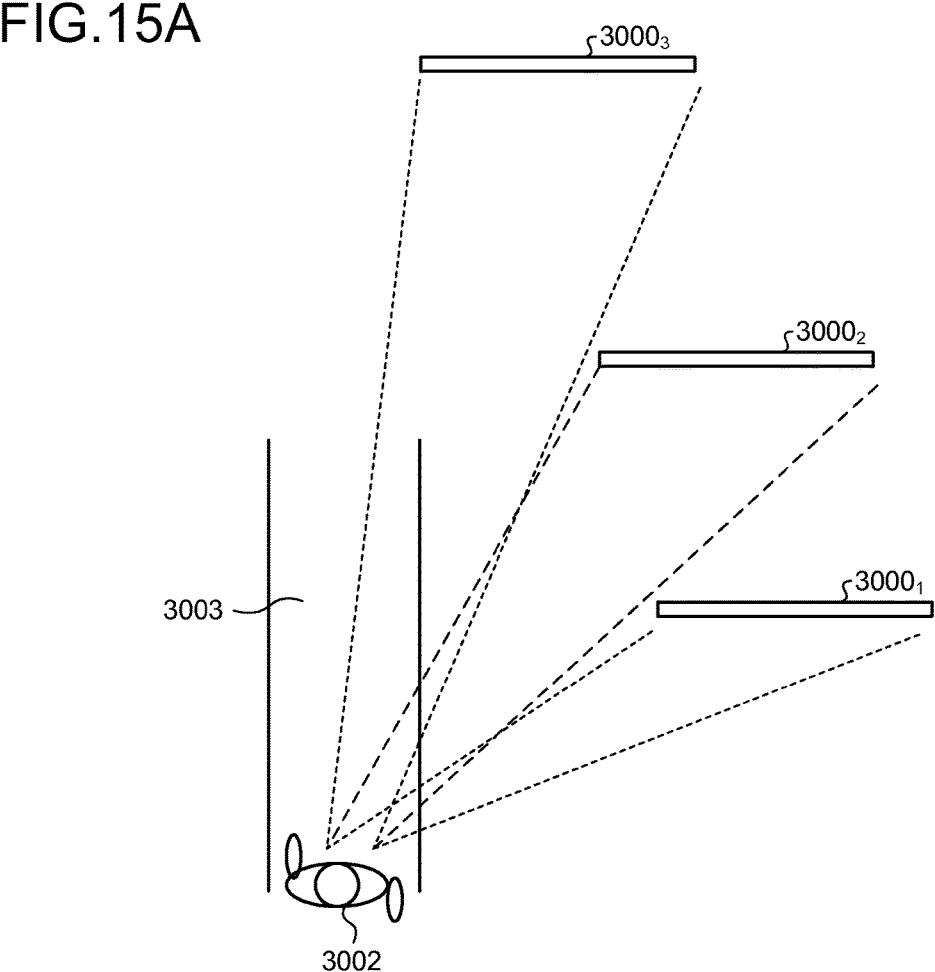
FIGS. 15A and 15B are diagrams illustrating the configuration of an example of a display system according to an application example of the second embodiment.
Figure 15B:
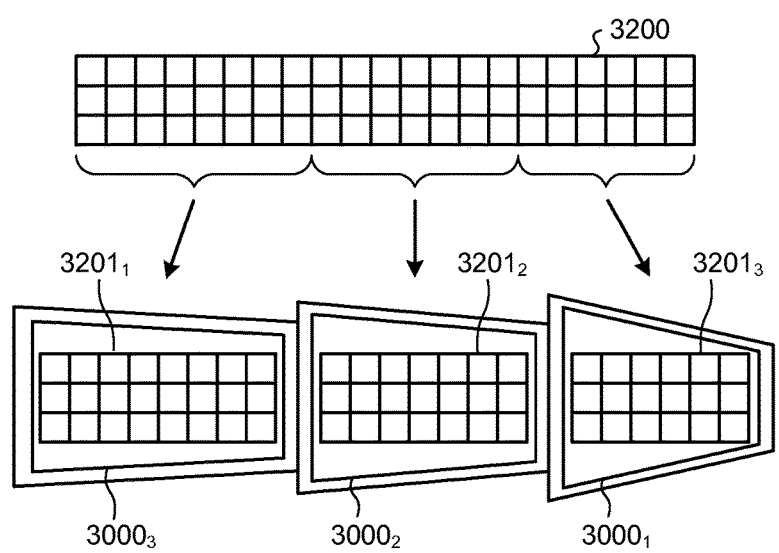

An application example of the second embodiment will be described. FIGS. 15A and 15B illustrate the configuration of an example of a display system according to the application example of the second embodiment. As illustrated as an example in FIG. 15A, consider a situation in which, when the user 3002 in the predetermined position views the displays $3000_1$, $3000_2$, and $3000_3$, the displays $3000_1$, $3000_2$, and $3000_3$ appear to continue to one another in the horizontal direction.

While, in FIG. 15A, the displays $3000_1$, $3000_2$, and $3000_3$ are arranged so as to be sequentially displaced from the pathway 3003 for facilitation of understanding, the arrangement is not limited to this example. The displays $3000_1$, $3000_2$, and $3000_3$ may be arranged, for example, parallel to the pathway 3003 as illustrated in FIG. 10.

In the above described case, one image 3200 is divided into three images, and the respective divided images are displayed on the respective displays $3000_1$, $3000_2$, and $3000_3$. At this point, the above-described calibration pattern image 3110 is displayed on the displays $3000_1$, $3000_2$, and $3000_3$, and the camera 40 captures the images of the displays $3000_1$, $3000_2$, and $3000_3$ from an assumed position of the user 3002.

Subsequently, the image correction device 50 calculates respective pieces of the correction information by using images of respective areas 3130 obtained from captured images obtained by capturing the images of the displays $3000_1$, $3000_2$, and $3000_3$ with the calibration pattern image 2000 displayed thereon as ideal pattern images of the respective displays $3000_1$, $3000_2$, and $3000_3$. The image correction device 50 uses the calculated respective pieces of the correction information to correct the three respective divided images of the image 3200, and thus obtains three trapezoidally distorted images with vertical and horizontal sizes increased from the left end toward the right end thereof according to the positional relations between the respective displays $3000_1$, $3000_2$, and $3000_3$ and the camera 40.

The three images that have been distorted by the correction based on the correction information are displayed on the respective displays $3000_1$, $3000_2$, and $3000_3$. By viewing the displays $3000_1$, $3000_2$, and $3000_3$, the user 3002 in the predetermined position can see as if rectangular images $3201_1$, $3201_2$, and $3201_3$ reconstructed the original image 3200 by continuing to one another, as illustrated in FIG. 15B.

Method for Calculating Correction Information Applicable to Each Embodiment

A method for calculating the correction information applicable to each of the embodiments will be explained. The calculation of the correction information requires obtaining the positions of the markers 2001', 2001', . . . corresponding to the respective markers 2001, 2001, from the calibration pattern image 2010 obtained by capturing the ideal pattern image 2000 in which the markers 2001, 2001, . . . are arranged, for example, in the example of FIG. 8.

After the positions of the markers 2001', 2001', . . . are obtained, differences between the obtained positions of the markers 2001', 2001', . . . and the known positions of the markers 2001, 2001, . . . in the ideal pattern image 2000 are obtained. Based on the obtained differences, differences in position of pixels of the calibration pattern image 2010 from corresponding pixels of the ideal pattern image 2000 are obtained using, for example, the linear transformation. Based on the obtained differences in position between respective pairs of the pixels, coefficients of, for example, the linear interpolation used for deforming the calibration pattern image 2010 into the ideal pattern image 2000 are obtained. For example, the linear interpolation using the obtained coefficients actually deforms images for being displayed on the screen 10 or the displays $3000_1$, $3000_2$, . . . .

A method for obtaining the positions of the markers 2001', 2001', . . . of the calibration pattern image 2010 will be explained below.

Figure 16:
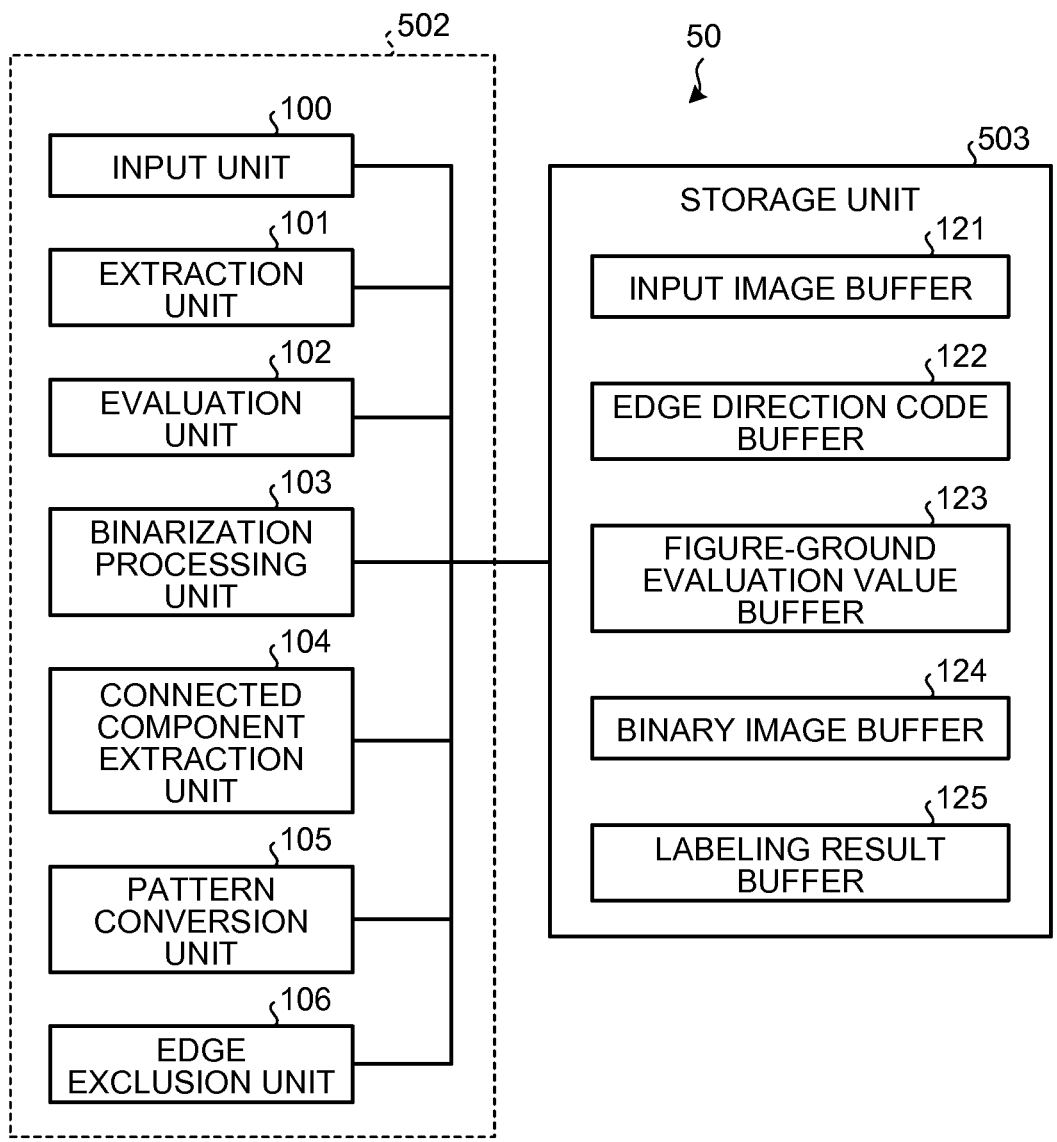
FIG. 16 is a block diagram illustrating an example of the configuration of a correction information calculation unit applicable to each of the embodiments.

FIG. 16 illustrates, in more detail, the configuration of an example of the correction information calculation unit 502 and the storage unit 503 in the image correction device 50. As illustrated in FIG. 16, the correction information calculation unit 502 includes an input unit 100, an extraction unit 101, an evaluation unit 102, a binarization processing unit 103 (binarization determination unit), a connected component extraction unit 104, a pattern conversion unit 105, and an edge exclusion unit 106. The functions of these units to be described below may be implemented by software or by hardware such as an electronic circuit.

The storage unit 503 includes buffer areas, that is, an input image buffer 121, an edge direction code buffer 122, a figure-ground evaluation value buffer 123, a binary image buffer 124, and a labeling result buffer 125.

A pattern image taken by the camera 40 is entered into the input unit 100. The entered pattern image is stored from this time on as an input image in the input image buffer 121 of the storage unit 503. The input image stored in the input image buffer 121 need not be the photographed data itself, but may be data obtained by applying image processing, such as size conversion or color correction, to the photographed data. In each of the embodiments, the input image is converted into a grayscale image in which pixels of each pattern element in the photographed image have luminance in the range of 0 (black) to 255 (white). Thereafter, the entered input image is subjected to pattern processing illustrated in FIG. 17 so as to generate a calibration pattern image for calibrating distortion. By comparing the calibration pattern image thus generated with the original undistorted pattern image, correction values for distortion correction processing are calculated.

Figures 17, 18A, 18B:
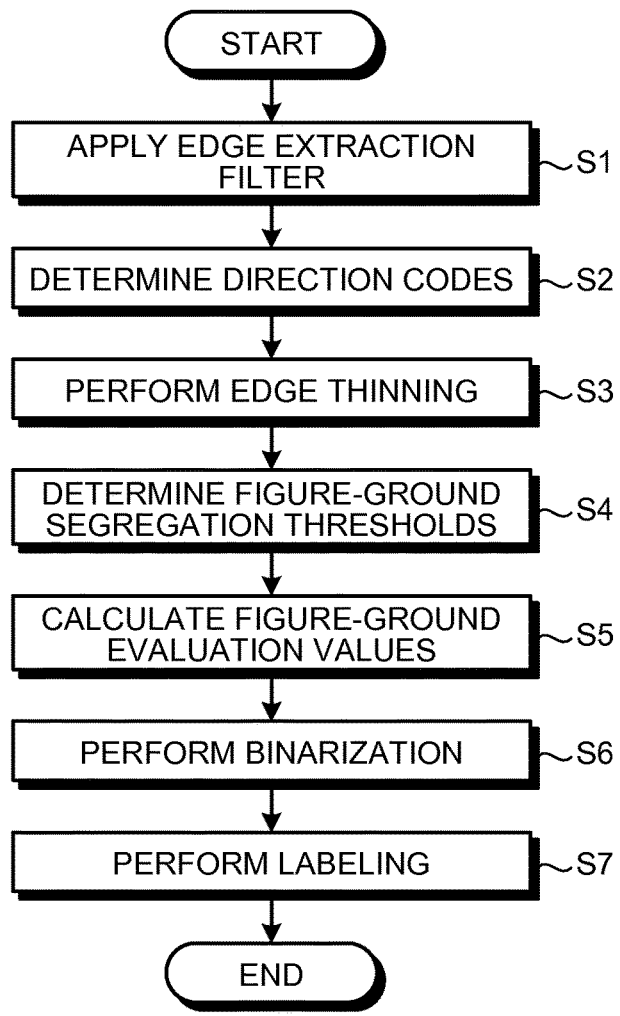
FIG. 17 is a flowchart illustrating a procedure of pattern processing applicable to each of the embodiments.
FIGS. 18A and 18B are diagrams illustrating an example of a Sobel filter applicable to each of the embodiments.

A procedure of the processing will be briefly explained using FIG. 17. First, at Step S1, the extraction unit 101 of the correction information calculation unit 502 applies an edge extraction filter that extracts edge pixels in the input image, edge strengths of the respective edge pixels, and gradient directions of the edge pixels. Then, at Step S2, the extraction unit 101 determines values of direction codes assigned to the respective pixels based on the value of a gradient direction θ calculated for each of the pixels. Then, at Step S3, the edge exclusion unit 106 of the correction information calculation unit 502 performs edge thinning processing for removing noise from the edges.

Then, at Step S4, the evaluation unit 102 of the correction information calculation unit 502 performs figure-ground segregation threshold determination processing of determining a threshold Q(x,y) that is set corresponding to a pixel according to a direction code among the pixels assigned with the direction codes. Then, at Step S5, the evaluation unit 102 performs figure-ground evaluation value calculation processing of calculating a figure-ground evaluation value C(x,y) that is a value for determining whether a pixel P(x,y) to be described later is a foreground pixel or a background pixel. Then, at Step S6, the binarization processing unit 103 of the correction information calculation unit 502 performs binarization processing. Then, at Step S7, the connected component extraction unit 104 of the correction information calculation unit 502 performs labeling processing of integrating figure pixels adjacent to a foreground pixel in a binary image B(x,y) on the left, right, top and bottom as one group.

Steps S1 to S7 described above will be explained below in more detail. At Step S1, the extraction unit 101 acquires the input image from the input image buffer 121, and applies the edge extraction filter that extracts the edge pixels in the input image, the edge strengths of the respective edge pixels, and the gradient directions of the edge pixels. The extraction unit 101 applies a Sobel filter illustrated in FIGS. 18A and 18B to each pixel P(x,y) (0≤x≤M−1, 0≤y≤N−1) constituting the input image, and thus, based on the following expressions (2) and (3), calculates each of the edge strengths E(x,y) and the gradient direction θ(x,y) that correspond to the pixel P(x,y) based on the following expression (1).

$$E(x,y)=\{Sx(x,y)^2+Sy(x,y)^2\}^{1/2} \quad (2)$$

$$\theta(x,y)=\arctan(Sx(x,y)/Sy(x,y)) \quad (3)$$

Sx(x,y) and Sy(x,y) are obtained by the following expressions (4) and (5).

$$Sx(x,y)=P(x+1,y-1)-P(x-1,y-1)+2\{P(x+1,y)-P(x-1,y)\}+P(x+1,y+1)-P(x-1,y+1) \quad (4)$$

$$Sy(x,y)=P(x-1,y+1)-P(x-1,y-1)+2\{P(x,y+1)-P(x,y-1)\}+P(x+1,y+1)-P(x+1,y-1) \quad (5)$$

Figures 19, 20:
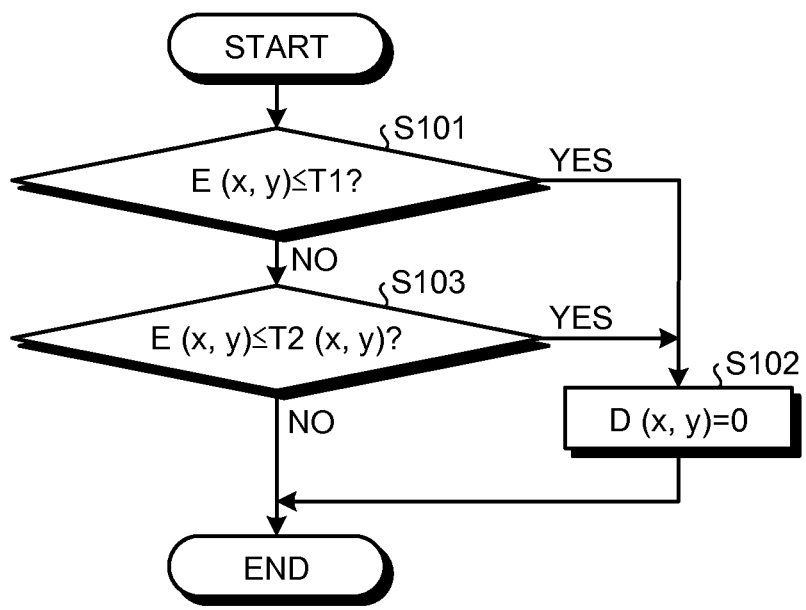
FIG. 19 is a diagram illustrating correspondence relations between luminance gradient directions and direction codes applicable to each of the embodiments.
FIG. 20 is a flowchart illustrating a procedure of processing of edge exclusion applicable to each of the embodiments.

At Step S2, the extraction unit 101 determines the value of a direction code to be assigned to each pixel based on the value of the gradient direction θ calculated for each pixel and with reference to FIG. 19. The angles of a luminance gradient direction in FIG. 19 is represented using a coordinate system with the origin at the top left corner of an image, the positive y-axis direction vertically downward, and the positive angle clockwise, according to a commonly used image processing technique.

As illustrated in FIG. 19, if the value of θ(x,y) is 67.5 degrees or greater, or −67.5 degrees or less, the pixel is assigned with a direction code D(x,y) of 1. "1" is a direction code representing that the direction is vertical. If the value of θ(x,y) is greater than 22.5 degrees, or less than 67.5 degrees, the pixel is assigned with a direction code D(x,y) of 2. "2" is a direction code representing that the direction is downward to the right. If the value of θ(x,y) is −22.5 degrees or greater, and 22.5 degrees or less, the pixel is assigned with a direction code D(x,y) of 3. "3" is a direction code representing that the direction is horizontal. If the value of θ(x,y) is greater than −67.5 degrees, and less than −22.5 degrees, the pixel is assigned with a direction code D(x,y) of 4. "4" is a direction code representing that the direction is upward to the right. These direction codes D(x,y) are associated with the respective pixels P(x,y), and are stored in the edge direction code buffer 122 of the storage unit 503. The direction codes are only given to the pixels extracted as the edge pixels, so that the pixels that are not the edge pixels are assigned with "0" as a direction code.

At Step S3, the edge exclusion unit 106 performs the edge thinning processing for removing noise from the edges. A specific procedure of the processing will be explained using FIG. 20. As illustrated in FIG. 20, at Step S101, the edge exclusion unit 106 first selects a pixel of certain coordinates (x,y), and determines whether the edge strength E(x,y) of the selected pixel P(x,y) is equal to or less than a predetermined threshold T1 (corresponding to a third threshold) set in advance. If so, the edge exclusion unit 106 performs processing at Step S102 to set D(x,y) serving as the direction code of P(x,y) to 0. In this process, later processing is performed regarding the pixel with a non-zero direction code as an edge, so that setting the direction code to zero causes the pixel to be excluded as an edge. E(x,y) may be set to zero instead if the later processing is performed based on the edge strength E(x,y) instead of the direction code.

If, at Step S101, E(x,y) is determined to be greater than the predetermined threshold T1 set in advance, the edge exclusion unit 106 performs processing at Step S103 to determine whether the edge strength E(x,y) is equal to or less than a predetermined threshold T2(x,y). The threshold T2 is a non-maximum suppression threshold for determining whether the edge strength E(x,y) is maximum among those of pixels adjacent to one another along the gradient direction, and is calculated based on one of the expressions illustrated in FIG. 21.

As illustrated in FIG. 21, if the direction code D(x,y) is 1, the threshold T2 is obtained as Max{E(x,y+1), E(x,y−1)}. Max{A,B} represents a function of obtaining the larger value of A and B. In the case of the above expression, the value of a larger luminance gradient strength is obtained among those of pixels adjacent in the up-down direction. If the direction code D(x,y) is 2, the threshold T2 is obtained as Max{E(x+1,y+1), E(x−1,y−1)}. In the case of this expression, the value of a larger luminance gradient strength is obtained among those of pixels adjacent in the upper left-lower right direction. If the direction code D(x,y) is 3, the threshold T2 is obtained as Max{E(x+1,y), E(x−1,y)}. In the case of this expression, the value of a larger luminance gradient strength is obtained among those of pixels adjacent in the right-left direction. If the direction code D(x,y) is 4, the threshold T2 is obtained as Max{E(x−1,y+1), E(x+1,y−1)}. In the case of this expression, the value of a larger edge strength is obtained among those of pixels adjacent in the upper right-lower left direction.

At Step S103, the edge exclusion unit 106 uses the threshold T2 calculated as described above to determine whether the edge strength E(x,y) is equal to or less than the predetermined threshold T2(x,y), and if so, performs the processing at Step S102 to set D(x,y) serving as the direction code of P(x,y) to 0 (Step S102). If, at Step S103, the edge strength E(x,y) is determined to be greater than the predetermined threshold T2(x,y), the edge exclusion unit 106 ends the process without performing the processing. The edges of pixels are thinned through the above-described processing. FIG. 22 is a diagram illustrating the direction codes assigned to pixels around a circle that have been subjected to the edge thinning processing and serve as one pattern element.

As illustrated in FIG. 22, of all pixels, pixels with a small edge strength and pixels with an edge strength not maximum in the edge gradient direction have a direction code of zero. As a result, a line segment of edges having a width of 1 and assigned with non-zero direction codes is indicated along the outline of the circle.

Then, at Step S4, the evaluation unit 102 performs the figure-ground segregation threshold determination processing of determining the threshold Q(x,y) that is set corresponding to a pixel according to a direction code among the pixels assigned with the direction codes. The term "figure-ground segregation threshold" refers to a threshold for determining whether a pixel is a foreground pixel (figure pixel) or a background pixel (ground pixel).

In FIG. 22, each of the pixels with a non-zero direction code has a maximum luminance gradient strength in the luminance gradient direction, so that two pixels P(x,y) adjacent in the gradient direction greatly differ in luminance from each other, one being a foreground pixel and the other being a background pixel. Accordingly, the present embodiment allows a determination to be made as to whether the pixel is a foreground pixel or a background pixel by setting the figure-ground segregation threshold to the median of the luminance of the two adjacent pixels P(x,y).

While, in this case, the threshold Q(x,y) is calculated for each pixel, a method can be employed in which, for example, pixels are divided into several groups, and the threshold Q(x,y) of a pixel is calculated from the average value of luminance of pixels in the group to which the pixels belong. In that case, the pixels belonging to the same group have a common threshold Q(x,y). FIG. 23 is a table listing expressions each of which calculates the figure-ground segregation threshold for the corresponding direction code.

As illustrated in FIG. 23, in the case of a pixel P(x,y) having a direction code D(x,y) of 1, the figure-ground segregation threshold Q(x,y) is calculated to be the median luminance of two upper and lower adjacent pixels that is represented by {P(x,y−1)+P(x,y+1)}/2. In the case of a pixel P(x,y) having a direction code D(x,y) of 2, the figure-ground segregation threshold Q(x,y) is calculated to be the median luminance of two upper-left and lower-right adjacent pixels that is represented by {P(x−1,y−1)+P(x+1,y+1)}/2. In the case of a pixel P(x,y) having a direction code D(x,y) of 3, the figure-ground segregation threshold Q(x,y) is calculated to be the median luminance of two right and left adjacent pixels that is represented by {P(x−1,y)+P(x+1,y)}/2. In the case of a pixel P(x,y) having a direction code D(x,y) of 4, the figure-ground segregation threshold Q(x,y) is calculated to be the median luminance of two upper-right and lower-left adjacent pixels that is represented by {P(x+1,y−1) P(x−1,y+1)}/2.

Then, at Step S5, the evaluation unit 102 subsequently performs the figure-ground evaluation value calculation processing of calculating the figure-ground evaluation value C(x,y) that is a value for determining whether a pixel P(x,y) is a foreground pixel or a background pixel. Based on FIG. 24, the following describes a procedure of using the figure-ground segregation threshold Q(x,y) calculated as described above to calculate the figure-ground evaluation value C(x,y) serving as a value for determining whether a pixel P(x,y) is a foreground pixel or a background pixel.

Figure 24:
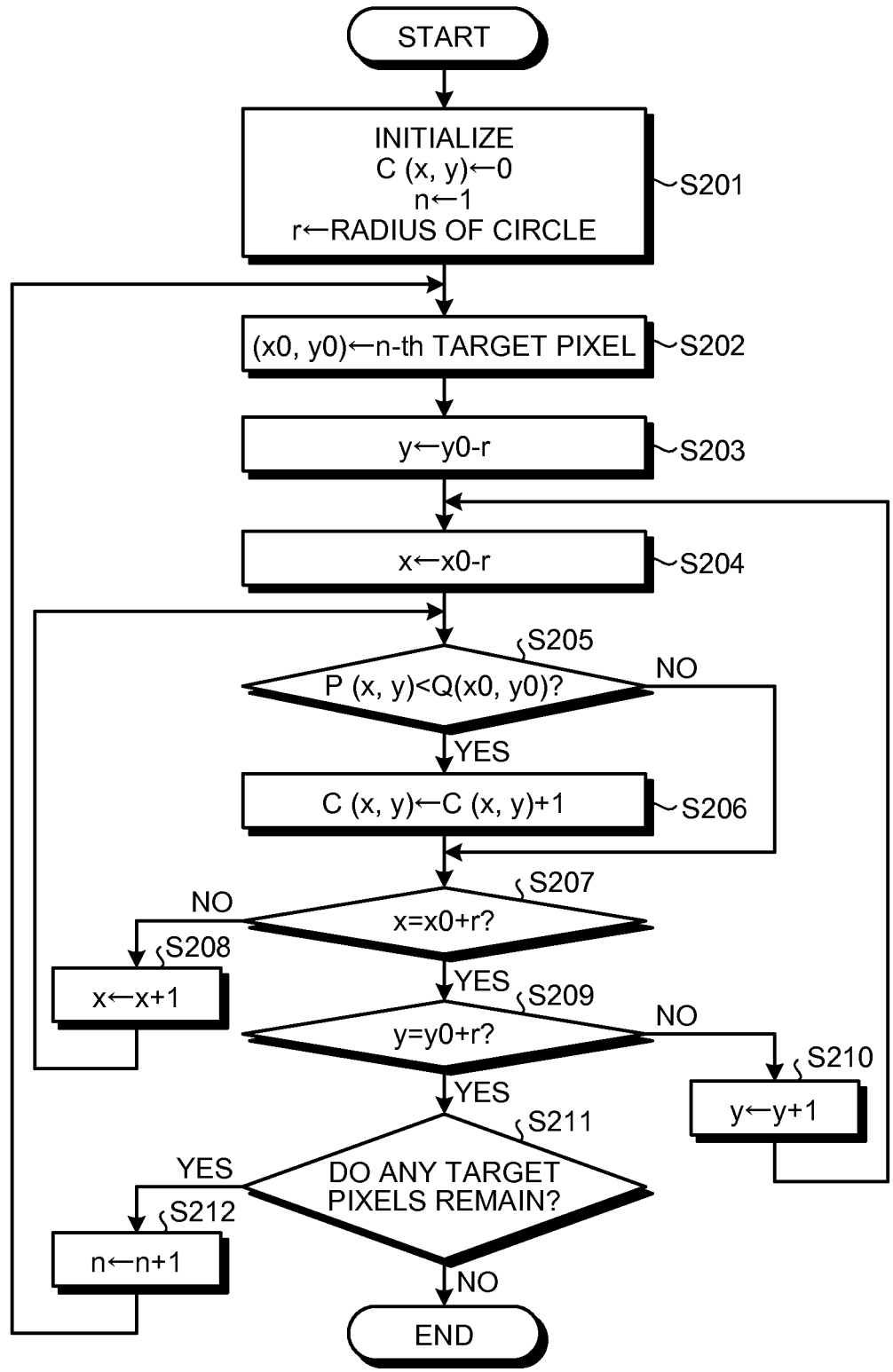
FIG. 24 is a flowchart illustrating an example of processing of calculating figure-ground evaluation values applicable to each of the embodiments.

As illustrated in FIG. 24, at Step S201, the evaluation unit 102 first initializes the figure-ground evaluation value C(x, y). The evaluation unit 102 initializes the value of n serving as a pointer for selecting a target pixel (one of pixels having a non-zero direction code) to 1, and substitutes the radius of the circle serving as a pattern element for the value of r. When evaluating a pixel P(x,y), the present embodiment evaluates, in addition to the pixel P(x,y), an area including a nearby region of the pixel P(x,y) using the figure-ground segregation threshold Q(x,y).

If only the neighborhood of the outline of the pattern element illustrated in FIG. 22 is subjected to the evaluation as to whether the pixels are foreground pixels or background pixels, the central portion of the pattern element cannot be subjected to the evaluation. Hence, the nearby region is preferably set to a region reflecting the size of the pattern element (here, the radius of the circle). Using the radius r of the circle serving as the pattern element, the present embodiment sets the nearby region to a rectangular region defined by a range from a start point (x0−r,y0−r) to an end point (x0+r,y0+r). The nearby region is not limited to be set to the rectangular region that spreads, from the target pixel serving as the center, upward, downward, rightward, and leftward by an amount equal to the radius r of the circle. The nearby region can be set to, for example, a rectangular region that has a side length ($=\pi^{1/2}r$) giving the same area as that of a circle, or a circular region that has a radius equal to 1.5 r.

Then at Step S202, the evaluation unit 102 sets the target pixel to the n-th pixel. The evaluation unit 102 sets the y-coordinate of representative coordinates to a coordinate obtained by subtracting r from y0 of the target pixel at next Step S203, and sets the x-coordinate of the representative coordinates to a coordinate obtained by subtracting r from x0 of the target pixel at further next Step S204. At next Step S205, the evaluation unit 102 determines whether the luminance of the pixel P(x,y) belonging to the nearby region is lower than the figure-ground segregation threshold Q(x0, y0). If the luminance of the pixel P(x,y) is lower (darker) than the figure-ground segregation threshold Q(x0,y0), the evaluation unit 102 performs processing at Step S206 to count up the figure-ground evaluation value C(x,y) corresponding to the pixel P(x,y) by one. If the luminance of the pixel P(x,y) is higher (lighter) than the figure-ground segregation threshold Q(x0,y0), the evaluation unit 102 performs processing at Step S207.

At Step S207, the evaluation unit 102 determines whether the coordinate x is (x0 r) that is the largest x-coordinate in the nearby region. If not, the evaluation unit 102 performs processing at Step S208 to increment x by one, and the process returns to Step S205, where the figure-ground evaluation value C(x,y) about the next coordinate is measured.

If the coordinate x is (x0 r) that is the largest x-coordinate in the nearby region, the evaluation unit 102 performs processing at Step S209 to determine whether the coordinate y is (y0 r) that is the largest y-coordinate in the nearby region. If not, the evaluation unit 102 performs processing at Step S210 to increment y by one, and the process returns to Step S204, where the figure-ground evaluation value C(x,y) about the next coordinate is measured.

If the coordinate y is (y0 r) that is the largest y-coordinate in the nearby region, the evaluation unit 102 performs processing at Step S211 to determine whether any target pixels remain. If so, the evaluation unit 102 performs processing at Step S212 to increment n by one, and the process returns to Step S202. If not, the series of processing ends.

FIG. 25 is a diagram illustrating a state in which the figure-ground evaluation value C(x,y) has been assigned to each of the pixels constituting the pattern element through the above processing. As illustrated here, the figure-ground evaluation value C(x,y) is higher in each of the pixels located in the internal area of the circle. This because each of the pixels having a non-zero directional code is included in the nearby region in internal area of the circle, and as a result, the evaluation value thereof increases. The evaluation unit 102 stores the figure-ground evaluation value C(x,y) assigned to each of the pixels into the figure-ground evaluation value buffer 123.

At Step S6, the binarization processing unit 103 performs the binarization processing. Using the figure-ground evaluation value C(x,y) stored in the figure-ground evaluation value buffer 123 and a positive threshold T3 (corresponding to a second threshold) set in advance, the binarization processing unit 103 calculates the binary image B(x,y) according to the following expressions (6) and (7)

$$B(x,y)=0 \text{ if } C(x,y)<T3 \qquad (6)$$

$$B(x,y)=1 \text{ if } C(x,y)\geq T3 \qquad (7)$$

FIG. 26 illustrates results of the binarization obtained using a threshold T3 of 4. Hereinafter, a pixel corresponding to B(x,y)=0 is called a "background pixel", and a pixel corresponding to B(x,y)=1 is called a "foreground pixel". As illustrated in FIG. 26, pixels regarded as foreground pixels are arranged along the circular shape of the pattern element. The binarized values of B(x,y) are stored together with the coordinates thereof into the binary image buffer 124.

At Step S7, the connected component extraction unit 104 performs the labeling processing of integrating figure pixels adjacent to a foreground pixel in the binary image B(x,y) on the left, right, top and bottom as one group. An existing labeling method is used for the labeling processing for the binary image. In this case, all pixels represented as "1" in FIG. 26 are connected, and a connected component corresponding to the shape of one circular pattern element are extracted.

Figure 27:
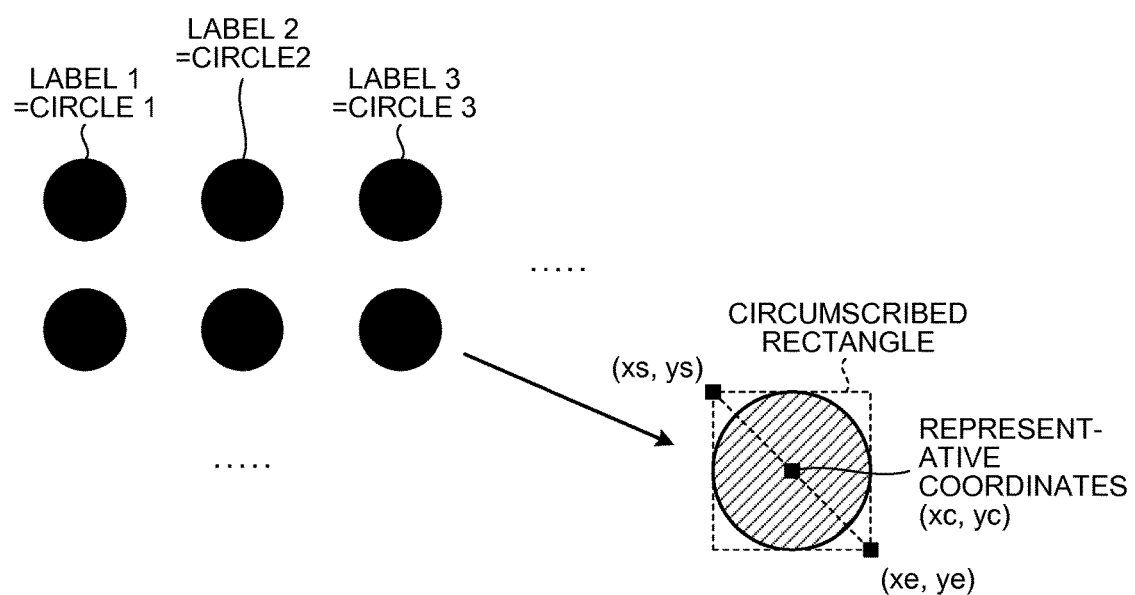
FIG. 27 is a diagram illustrating labeled connected pixel components applicable to each of the embodiments.

The labeling obtains connected figure pixel components each of which is uniquely labeled. As illustrated in FIG. 27, because each individual connected figure pixel component is considered to correspond to one circle, the i-th connected figure pixel component is output as the i-th pattern element (circle). The output result of the labeling is stored into the labeling result buffer 125.

In this case, the connected figure pixel component need not be actually generated as image data, but the fact that the pixels are connected only needs to be treatable as data. In that case, the midpoint between a start point (xs,ys) and an end point (xe,ye) of a circumscribed rectangle around the connected figure pixel component corresponding to one circle is used as representative coordinates (xc,yc) of the circle. The representative coordinates (xc,yc) are calculated by the following expressions (8) and (9).

$$xc=(xs+xe)/2 \qquad (8)$$

$$yc=(ys+ye)/2 \qquad (9)$$

The pattern conversion unit 105 converts the generated connected pixel components as respective pattern elements, and the calibration pattern image constituted by the pattern elements is obtained. Thus, based on one input image, circles of the pattern elements constituting a pattern image are extracted as connected pixel components, and the representative coordinates of the respective circles are acquired. The differences between the calibration pattern image obtained in this manner and the ideal pattern image are calculated, and the correction information for the display image is obtained.

The present invention has an effect of allowing a distortion of an image to be reduced when a screen or a display is viewed from an oblique direction.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system comprising:
a display apparatus;
an image capturing apparatus; and
an image processing apparatus,
the display apparatus comprising a display unit to display an image on a display medium, the display medium including a first display medium and a second display medium,
the image capturing apparatus comprising an image capturing unit to output a captured image obtained by imaging a subject, and
the image processing apparatus comprising:
a first acquiring unit to acquire a first pattern image including a pattern for being displayed on the display medium by the display unit;
a second acquiring unit to acquire, as a second pattern image, a captured image obtained by capturing an image obtained by displaying the first pattern image on the display medium with the display unit, the capturing being performed by the image capturing apparatus from a position of the display medium; and
an image processing unit to compare the first pattern image with the second pattern image, and to apply a process of deforming a shape based on the second pattern image into a shape of the first pattern image to a rectangular target image according to a result of the comparison,
wherein the display unit is configured to display the target image deformed by the image processing unit on the display medium,
wherein the first and the second display media are placed such that respective display surfaces of the first and the second display media appear to continue to each other when viewed by a person in at least one position, and
wherein the display apparatus is configured to respectively display images obtained by dividing one image on the first and the second display media.

2. The image processing system according to claim 1, wherein
the rectangular target image is a captured image obtained upon the image capturing unit capturing an image displayed by the display unit, and
the image processing unit is configured to apply processing of deforming a shape of the second pattern image into a shape of the first pattern image to the target image.

3. The image processing system according to claim 1, wherein the display medium is placed such that a display surface of the display medium faces a direction assumed to be an advancing direction of a person, and does not intersect an assumed movement line of the person.

4. An image processing apparatus comprising:
a first acquiring unit to acquire a first pattern image including a pattern for being displayed on a display medium by a display unit, the display medium including a first display medium and a second display medium;
a second acquiring unit to acquire, as a second pattern image, a captured image obtained by capturing an image obtained by displaying the first pattern image on the display medium from a position of the display medium; and
an image processing unit to compare the first pattern image with the second pattern image, and to apply a process of deforming a shape based on the second pattern image into a shape of the first pattern image to a rectangular target image according to a result of the comparison, the target image deformed by the image processing unit being displayed on the display medium,
wherein the first and the second display media are placed such that respective display surfaces of the first and the second display media appear to continue to each other when viewed by a person in at least one position, and
wherein the display unit is configured to respectively display images obtained by dividing one image on the first and the second display media.

5. The image processing apparatus according to claim 4, wherein
the rectangular target image is a captured image obtained upon capturing an image displayed by the display unit, and
the image processing unit is configured to apply processing of deforming a shape of the second pattern image into a shape of the first pattern image to the target image.

6. The image processing apparatus according to claim 4, wherein the display medium is placed such that a display surface of the display medium faces a direction assumed to be an advancing direction of a person, and does not intersect an assumed movement line of the person.

7. An image processing method comprising:
acquiring a first pattern image including a pattern for being displayed on a display medium by a display unit, the display medium including a first display medium and a second display medium;
acquiring, as a second pattern image, a captured image obtained by capturing an image obtained by displaying the first pattern image on the display medium from a position of the display medium; and
comparing the first pattern image with the second pattern image, and deforming a shape based on the second pattern image into a shape of the first pattern image to a rectangular target image according to a result of the comparison, the target image deformed at the comparing being displayed on the display medium,
wherein the first and the second display media are placed such that respective display surfaces of the first and the second display media appear to continue to each other when viewed by a person in at least one position, and
wherein images obtained by dividing one image are respectively displayed on the first and the second display media.

8. The image processing method according to claim 7, wherein
the rectangular target image is a captured image obtained by capturing an image displayed by the display unit, and
the deforming includes applying processing of deforming a shape of the second pattern image into a shape of the first pattern image to the target image.

9. The image processing method according to claim 7, wherein the display medium is placed such that a display surface thereof faces a direction assumed to be an advancing direction of a person, and does not intersect an assumed movement line of the person.

* * * * *